(12) United States Patent
Wu

(10) Patent No.: US 8,935,266 B2
(45) Date of Patent: Jan. 13, 2015

(54) INVESTIGATIVE IDENTITY DATA SEARCH ALGORITHM

(71) Applicant: Jianqing Wu, Beltsville, MD (US)

(72) Inventor: Jianqing Wu, Beltsville, MD (US)

( * ) Notice: Subject to any disclaimer, the term of this patent is extended or adjusted under 35 U.S.C. 154(b) by 106 days.

(21) Appl. No.: 13/758,973

(22) Filed: Feb. 4, 2013

(65) Prior Publication Data

US 2014/0222780 A1    Aug. 7, 2014

(51) Int. Cl.
*G06F 17/30* (2006.01)
(52) U.S. Cl.
CPC ................. *G06F 17/30696* (2013.01)
USPC ........................................................ 707/755
(58) Field of Classification Search
None
See application file for complete search history.

(56) References Cited

U.S. PATENT DOCUMENTS

| | | | |
|---|---|---|---|
| 2011/0246489 A1* | 10/2011 | Pope et al. | 707/754 |
| 2011/0320484 A1* | 12/2011 | Smithies et al. | 707/769 |
| 2012/0265783 A1* | 10/2012 | Kenedy et al. | 707/769 |
| 2013/0041909 A1* | 2/2013 | Coleman et al. | 707/758 |

* cited by examiner

*Primary Examiner* — Wilson Lee
(74) *Attorney, Agent, or Firm* — Jianqing Wu

(57) ABSTRACT

An identity search algorithm for identifying a plurality of identity data such as personal names and entity names that might exist in a table or file containing a large number of identity data in an investigative environment. The algorithm is intended to identify person and entities in the shortest time possible with an overly inclusive results. The core algorithm is used in an environment with a growing number of names in the table, and implemented with a web-based user interface, it can dramatically improve identity-searching efficiency and increase the chance to generate useful leads in typical discovery and investigation.

22 Claims, 26 Drawing Sheets

| Assign Project Manager | View Project Managers | Project Discussion Board | E-mail | Log out |
|---|---|---|---|---|

| Project Code | Project Full Name | Project Manager | Password | E-mail | Actions |
|---|---|---|---|---|---|
| glg | Corporate Litigation Site | g-admin2 | 222222 | manager@test.com | View Modify Delete |
| mdg | My discussion Group | g-admin1 | 111111 | gbp@test.com | View Modify Delete |

FIG. 1

| Assign Project Manager | View Project Managers | Project Discussion Board | E-mail | Log out |
|---|---|---|---|---|

| Project Manager | Project Code | Project Full Name | | |
|---|---|---|---|---|
| g-admin1 | mdg | My Discussion Group | Open View | Conventional View |
| g-admin2 | glg | Corporate Litigation Site | Open View | Conventional View |

FIG. 2

| Assign Project Manager | View Project Manager | Assign Project Manager | Discussion Board | E-mail | Log out |
|---|---|---|---|---|---|

Assign Project Manager

| | | |
|---|---|---|
| Login name | ☐ | (1-20 letters) |
| Password | ☐ | (6-20 letters) |
| Confirm Password | ☐ | |
| Email Address (opt) | ☐ | |

Submit

FIG. 3

Name Search | Full Screen | Email | Setup Project | Setup Tables | Log out — 200

My Discussion Group — 201     Date: 3/2/2009
Global Search     Manager: Manager Lastname

| Notes | Transaction | Attorneys | Production | Table1 | Table2 | Discussion | Pad | Instructions |

Change Manager's Password

- Change Manager Pwd
- Update Manager Info
- Modify Project Setup
- View Project Members
- Assign New Members
- Manage Shared Account
- Export Project Files
- Import a Project Zip
- Reset Configuration by File

202

Manager's Old Password [         ] (6-20 letters)
Manager's New Password [         ]
Confirm New Password [         ]

[Submit]  203

Modify Project Setup

Project Full Name: [Corporate Litigation Site]  (1-50 letters)
Project Code: [glg]  (3-10 letters)
Member Login Methods: [Group and Personal ▼]
Entry Validation Method: [Via Combined Table ▼]

Do you allow server's administrator to access your group's project data?

○ Yes    ● No

[Submit]

FIG. 5

View Project Members

| Member No. | Member | Password | E-mail | |
|---|---|---|---|---|
| 4 | 2person1 | 2person1 | gbp@test.com | View Modify Delete |
| 5 | 2person2 | 2person2 | | View Modify Delete |
| 6 | 2person3 | 2person3 | | View Modify Delete |

Assign Project Members

Assign members' login name and password:

Login Name [ ] (1-20 letters)
Password [ ] (6-20 letters)

[Submit] — 205

---

Add Login names and passwords for plural members:

You may upload a text file (e.g. yourfilename. txt ) containing name-password pairs (e.g., johnsmith10, pass8759; jonstone, pass7658 ) where the name-password pairs are delimited by a carriage return or semicolon.

[ ] [Browse]

[Submit] — 206

FIG. 7

Manage Project Shared Account

Group login account was modified successfully!

Shared Login Name [myglg] (1-20 letters)
Shared Password [111111] (6-20 letters)

[Submit]

FIG. 8

Export Project

It allows you to export project data in different formats.

Please choose export file format:

○ Human friendly zip file        ● Database zip file

Please select tables to export:

[Export the whole project]

- [X] Group Info
- [X] Discussion
- [X] Email
- [X] Owner Pad
- [X] Member Pads
- [X] Notes
- [X] Transaction Table
- [X] Attorney Names Table
- [X] Acronym

[Export]

FIG. 9

Import a Project Zip

Please choose your Import method

○ Replace all existing tables and data by the tables and data from imported file.
● Import selected tables from your project file.

Plaease select tables to import: [Select All]    — 207

- [ ] Group Info
- [ ] Discussion
- [ ] Email
- [ ] Owner Pad
- [ ] Members Pad
- [ ] Notes
- [ ] Transaction Table
- [ ] Attorney Name Table
- [ ] Acronym Please Choose your importing method:    — 208

● Import table structure and data.
○ Replace existing data in the tables by imported data.
○ Update data in the tables (Keep all existing data).

Please Select your project zip file    — 209

[_____| Browse ]

[Import]

FIG. 10

Reset Configuration By File

Please choose your option to configure your project setups:

○ Restore all project settings to system's default
○ Delete all data from all tables (including email and discussion board).
⦿ Reset selected tables by configuration file.

[Select All]

☐ Notes
☐ Transaction Table
☐ Attorney Name Table
☐ Acronym

[_____] [Browse]

Other Requirement (Option):

☐ Delete tables, if selected tables do not match the configuration file.
☐ Create new tables, if select tables do not match the configuration file.

○ Reset all tables by configuration file (delete all data).

[Configuration]

FIG. 11

| Table | Set up Tables and Boards | | | |
|---|---|---|---|---|
| Notes | Data Entry | Modify Table | Delete Table & Backup Data | Advanced Setup |
| Transaction Table | Data Entry | Modify Table | Delete Table & Backup Data | Advanced Setup |
| Attorney Names Table | Data Entry | Modify Table | Delete Table & Backup Data | Advanced Setup |
| Production | Data Entry | Modify Table | Delete Table & Backup Data | Advanced Setup |
| Table1 | Setup | | | |
| Table2 | Setup | | | |
| Pad | Modify | | | |

Set Up More Table

FIG. 12

Create Table or Board

\* Board Navigation [Attorney Name] (Fewer than 15 letters)
Table Name [Name] (Fewer than 20 letters)

[Insert entry] [Delete entry]

Col 1 Field [First_Name] Type [VARCHAR ▼] Length [30] Not NULL ☐ Unique ☐
Col 2 Field [Last_Name] Type [VARCHAR ▼] Length [30] Not NULL ☐ Unique ☐
Col 3 Field [Firm] Type [VARCHAR ▼] Length [100] Not NULL ☐ Unique ☐
Col 4 Field [Notes] Type [VARCHAR ▼] Length [200] Not NULL ☐ Unique ☐

[Submit]

FIG. 13

Back to Summary Page

| | Modify Table for Name | | | | |
|---|---|---|---|---|---|
| | Field | Type | Null | Unique | Data Source |
| ☐ | First_Name | VARCHAR(30) | Yes | No | Data Source |
| ☐ | Last_Name | VARCHAR(30) | Yes | No | Data Source |
| ☐ | Firm | VARCHAR(100) | Yes | No | Data Source |
| ☐ | Notes | VARCHAR(200) | Yes | No | Data Source |

Delete   Add   Modify

FIG. 14

Modify Columns for Name

Field [Last_Name]   Type [VARCHAR ▼]   Length [30]   Not NULL ☐   Unique ☐

Submit

FIG. 15

Change Navigation Name, Table Name, Access Rule, Validation Route, Validation Method, and Display Scope

Setup for Table: Transaction

| | | |
|---|---|---|
| Navigation Name | Transaction | (Fewer than 15 letters) |
| | Transaction_table | (Fewer than 20 letters) |
| Data validation Page | Via Combined Table ▼ | |
| Data Validation Method | Validation by Vote ▼ | |
| Votes | 3 | |
| Data Access Rule | Private Edit ▼ | |

Change

Name Search | Full Screen | Email | Set up Project | Set up Tables | Log out

My Discussion Group

Date: 3/3/2009
Manager: Manager Lastname

| Notes | Transaction | Global Search | Attorneys | Validated Table | Acronym | Table1 | Table2 Combined Table Tentative | Discussion Edit table | Pad | Instructions |

Attorney Name Table

Search [ On ]

| | No. | Email | First Name | M | Last Name | Company | Date | Type | Comments | Entry_date | Initials |
|---|---|---|---|---|---|---|---|---|---|---|---|
| ☐ | 1170 | test1170@test.com | Jack | | Jones | Snow and Ice PC | 11/01/2008 | 2 | test | 03/03/2009 08:44:52 | null |
| ☐ | 1161 | test1161@test.com | Jennifer | | Jones | Snow and Ice PC | 11/01/2008 | 2 | test | 03/03/2009 08:44:52 | null |
| ☐ | 76 | | | | | East & West LLP | 12/01/2008 | 3 | company | 03/03/2009 08:44:52 | null |
| ☐ | 64 | | | | | Get Cash & Stone LLC | 12/13/2008 | 3 | Data for test use only | 03/03/2009 08:44:52 | null |

Currant Votes: 1

| User ID | Initials | Vote Date |
|---|---|---|
| 3 | TST | 2009-03-03 14:28:43 |

[Enter] [Edit] [Delete] [Validate] [Vote] [Revoke]

FIG. 18

| Discussion Board |||
|---|---|---|
| Open View     Conventional View |||
| Subject | Date | Users |
| Server Speed | 03/03/2009 | TST1/Tester2 |
| Server speed | 03/03/2009 | TST |
| New Law Firm | 03/03/2009 | TST2 |
| 216 →    Submit Message   Search Message |||

FIG. 19

Open View     Conventional View

◎ Server speed

Member Name: TST1/Tester2 | Post Date: 03-03-2009 | IP: 192.168.41.70

The server is really slow. Do you have any issue?

Menu.jpg

◎ Server speed

Member Name: TST | Post Date: 03-03-2009 | IP: 192.168.41.70

I did not have any problem now.

◎ New Law Firm

Member Name: TST2 | Post Date: 03-03-2009 | IP: 192.168.41.70

I have encountered a new law firm, which is not listed in our review book. This firm appears to be an international firm who worked for or against our client. Its name is Zoolet firm. Can anyone confirm this?

Submit Message    Search Messages

FIG. 20

| Open View | Conventional View |
|---|---|
| New Law Firm | |

Member Names: TST2 | Post Date : 03-03-2009 | IP: 192.168.41.70

I have encountered a new law firm, which is not listed in our review book. This firm appears to be an international firm who worked for or against our client. Its name is Zoolet firm. Can anyone confirm this?

217

Back to Summary Page　　See Related Messages　　Submit Message　　Search Messages

FIG. 21

| Open View | Conventional View |
|---|---|

Send Member Message

*Subject: Server speed
Search Keys: Server
Your Name (opt): TST
Email Address (opt):
Phone (opt): 1112223333

*Message: I have problem with the server functions

The page at http://localhost:9080 says:　　[X]

If you are satisfied with your message, please press confirm
After the message is posted, you can't withdraw it..

[Cancel]　　[OK]

[/root/test files/menu.jpg] [Browse...]　　Remove filepath

Add more file path (pdf, jpg, txt, doc etc...file extensions/formats)

[Submit]　　　　Search Messages

FIG. 22

| Open View | Conventional View |
|---|---|

Search Member Messages

Subject [Server_____] [Go]

---

Subject [Server_____]

Date ● at any time, or ○ in the period

Between [January ▼] [1 ▼] [2007 ▼] and [January ▼] [1 ▼] [2008 ▼]

Search Key [_____]

[More Search Key] [Fewer Search Key]

(You may enter as many search keys as possible, but may leave some search-key boxes blank at the end. Blank is treated as any value.)

[Search] [Reset]

Submit Message

FIG. 23

Name Search | Full Screen | Email | Manage Account | Log out

My Discussion Group

Date: 3/3/2009   Project Code: mdg
Member: Test Lasttest

| Notes | Transaction | Global Search | Attorneys | Acronym | Table1 | Table2 | Discussion | Pad | Instructions |
|---|---|---|---|---|---|---|---|---|---|
| | | | Validated Table | Combined Table | Tentative | Edit table | | | |

Attorney Name Table

On [ ] Search

| | No. | Email | First Name | MI | Last Name | Company | Date | Type | Comments | Entry date | Initials |
|---|---|---|---|---|---|---|---|---|---|---|---|
| ☐ | 1170 | test1170@test.com | Jack | | Jones | Snow and Ice PC | 11/01/2008 | 2 | test | 03/03/2009 08:44:52 | |
| ☐ | 1161 | test1161@test.com | Jennifer | | Jones | Snow and Ice PC | 11/01/2008 | 2 | test | 03/03/2009 08:44:52 | |
| ☐ | 769 | test769@test.com | Mary Sidney | | Jones | East & West LLP | 12/01/2008 | 3 | company | 03/03/2009 08:44:52 | |
| ☐ | 645 | | Betty Lynne | | Jones | Get Cash & Stone LLC | 12/13/2008 | 3 | Data for test use only | 03/03/2009 08:44:52 | |

[Enter]   [Edit]   [Delete]   [Vote]   [Revoke]

FIG. 24

| Validated Table | | Combined Table | | Tentative Table | | | |
|---|---|---|---|---|---|---|---|
| | | Name | | | | | |
| | | | | | | Search | |
| No. | First_Name | Last_Name | Firm | Notes | Entry_date | App | Initials |
| 5 | Charles | Collard | Stone & Waters LLP | Plaintiff's first firm | 08/17/2008 13:50:43 | 0 | PET |
| 2 | Lisa | Woods | Woods & Associates LLP | Do commercial papers. | 08/17/2008 13:44:09 | 0 | TST |
| 1 | John | Smith | Black & White LLP | Plaintiff Law firm | 08/17/2008 13:43:10 | 0 | TST |
| | | | Add Entry | | | | |

FIG. 25

| Validated Table | | Combined Table | | Tentative Table | | | |
|---|---|---|---|---|---|---|---|
| | | Name | | | | | |
| | | | | | black | Search | |
| No. | First_Name | Last_Name | Firm | Notes | Entry_date | App | Initials |
| 7 | Lisa | Green | Black&Blue LLP | NA | 08/17/2008 15:14:13 | | MAN |
| 1 | John | Smith | Black&White LLP | Plaintiff's Law firm | 08/17/2008 13:43:10 | 0 | TST |
| | | | Add Entry | | | | |

| Validated Table | Combined Table | Tentative Table | Edit Table |

Edit Transaction Table ← 219

220

[Search box] [Search]

| | Transaction_name | Date | Comment |
|---|---|---|---|
| [C][P][D] | Test | 2008-12-30 | This is first test data |
| [C][P][D] | | | |

Enter Record
← 221

223 → [Save Changes] [Discard Changes]

222 → Draft agreement / Public Record / Press Release / Personal Communication / Email

Global Search Result

Search Key: firm    First Display: [Name ▼] (227)    Order By: [Sys_record_id ▼] (228)  [Go]

1. John;;Smith;;Black & White LLP;;Plaintiff's Law Firm   [Name]

3. Tom;;Fleet;;Brown & Blue LLP;;Possibly, a law firm for the Defendant   [Name]

4. Sally;;Sads;;Caleb Law Firm;;Unknown Law Firm   [Name]

5. Charles;;Collard;;Stone & Waters LLP;;Plaintiff's First firm   [Name]

6. Unknown;;Gerossiagic;;Foreign Law Firm;;More Information is needed   [Name]

2. 127.0.0.1;;08-17-2008 14:01:21;;Foreign Law Firm Foreign Firm;;This message is concerning with a foreign law firm. [Discussion Board]

5. 127.0.0.1;;08-17-2008 14:14:43;;New Foreign Law Firm II Foreign Firm;; More information about this foreign law firm. [Discussion Board]

FIG. 30

Search Identity Data in the Name Table

<u>Sort Names</u>

Enter names to be found in the attorney table in the database:

From: John Smith
Sent: November 14, 2006;
To: Dean Smith; <u>Snoon</u> L. Steal; <u>Matalish</u>, Store; Job; black; ABC; X. T.; X. Y. Z.; notation99@test.com; "uknowntwo@test.com"; "uknownthree@test.com"; David.Bidlow@test.com; David.T.Seth@test.com; David Franklin ⦿ Default Search <u>View</u> <u>Setup</u>   ○ Current Search Setup <u>View</u>  ↑
[Search]   ⬅ 801     800

Setup for Default Identity Data Search

Delimiter for Separating Names:
 ○ Comma    ⦿ Semicolon    ○ Carriage Return Mark words [From; To;] (Separated by Semicolon)
Ignored words [            ] (Separated by Semicolon)

Marks for Ignored Ranges: <u>Add a Range</u>  <u>Remove a Range</u>
[Sent]  [            ]

Match Methods:
☐ Basic and reliable matches set by system

☐ Match both names, email address or acronyms (FD & C in firm/comment)
☐ Match initial & last names (J. Smith to Jon Smith; Ted Smith to T. Smith)
☐ Match keyed initials with full names (J.S. with Jon Smith or John Stone)
☐ Find derived initials in comments (for J.S. or Jo Shy, find j.s., J.M.S., JMS.)
☐ Regard small key (jo, job) as initials and find it in names & comments
☐ Match single key with first & last name (jack with Jack Smith or John Jack)
☐ Match single key with a word in firm names (black with White & Black)
☐ Match last name only (for Jo Smith, find Ted Smith and Jack Smith)
☐ Match first name only (for Jo Smith, find Woods and Jo Black)

Show Type:
☒ Law firm    ☐ Client    ☐ Partner    ☐ Other Parties

Order By:
○ Name->Firm->Email    ○ Email->Name->Firm    ○ Firm->Name->Email
○ Name->Email->Firm    ○ Email->Firm->Name    ○ Firm->Email->Name

[Save]  [Cancel]  [Revert to Common Mode]

FIG. 33

Names not found

Identity Data Search Results

803 — 804 — Ordered by | Name->firm->Email ▼

| Source | | | Found Identity Data Entries | | | | |
|---|---|---|---|---|---|---|---|
| Name | Field | No | Name | Firm | Data | Comments | Email |
| John Smith | From | 1 | Fleming | Stone LLP | 11-10-08 | JS is a worker in this company. | Test3@test.com |
| Dean Smith | To | 1 | Smith, Dean | Greens, PC | 11-01-08 | For test use | Test1122@test.com |
| David Franklin <df123456@test.com> | To | 15 | Farrell, Jack | Duncans & Woods,LLP | 11-01-08 | His boss Is d.f. | Test932@test.com |
| | | | Franklin, David | Franklin & Black | 11-01-08 | For test use | Test981@test.com |
| "Dave Farr" <david.far@test.com> | To | 16 | Farrell, Jack | Duncans & Woods, LLP | 11-01-08 | His boss Is d.f. | Test932@test.com |
| ABC | To | 6 | Anderson Charlotte | Johnson Law, LLC | 11-10-08 | Data for test use only | ←805 |
| | | | Vinson. Kristina | Part of ABC firm | 11-01-08 | For test purpose | Test1202@test.com |
| X.Y.Z. | To | 8 | Bumpus, Laura | Snow & Ice PC | 11-01-08 | She is married to X.Y.Z. | Test1126@test.com |
| | | | Zedon, Xerron | Private Firm | 11-01-08 | test | Test1198@test.com |

FIG. 34

Identity Data Search Results —806

| Show names not matched | Hide names not matched | Show matched names | Hide matched names |
|---|---|---|---|

| | Field | No | Identity Data Not Found |
|---|---|---|---|
| | To | 2 | Snoon L. Steal |
| | | 3 | Matalish, Store |
| | | 4 | Job |
| | | 5 | black |
| | | 6 | ABC |
| | | 7 | X.T |
| | | 8 | X.Y.Z. |
| | | 9 | notation99@test.com |
| | | 10 | "uknowntwo@test.com" |
| | | 11 | "uknownthree@test.com" |
| | | 12 | David.Biglow@test.com |
| | | 13 | David.T.Seth@test.com |
| | | 14 | Sneal,David@test.com |
| | | 17 | "Dulles,Steven M."<dullles.steven@test.com> |
| | | 18 | "Darlene Homes" "specialchars@test.com" |
| | | 19 | "Darlene Homes"<notknown@test.com> |
| | | 20 | "Dolly Dole"<notknown@test.com>[mailto:notknown@test.com] |

FIG. 35

Identity Data Processing

Names in Group A:        Back        <u>Normal View</u>

— 860

```
From:  Jack Smith; Le Strong; Dick; ABC; Job; X.Y.Z.; Jack;
       Lisa Black; Greg M. Howa;test@test.com
Sent:  November 14, 2008
To:    Dean Smith; L. Stone; Gorer.Blue@test.com; xyz;
       David Franklin; G.M.Homes; Spade North; Mary Allen St
```

Names in Group B:        — 861

```
From:  John Smith
Sent:  Novermber 14, 2008
To:    Dean Smith; Star L. Steal; Marty, Store; xyz; X.T.;
       X.Y.Z.; natation11@test.com; "nv9900@test.comy
```

⦿ Default Search <u>View</u> <u>Setup</u>    ○ Current Search Setup <u>View</u>

[Submit]

FIG. 38

Setup for Current Search and Processing

○ Current Setup   Hide

Name delimiter:
    ○ Comma   ● Semicolon   ○ Carriage Return

Names in Group A grouped by more than:   [ 2 ] Carriage returns

Mark words   [ From; To; ]   (Separated by Semicolon)
    End words    [ null ]         (Separated by Semicolon)
    Ignored words [         ]      (Separated by Semicolon)

Marks for Ignored Ranges: More Range  Less Range

[ Sent ]   [          ]

Match Methods:

☐ Basic and reliable matches set by system

☒ Names, email & acrynom   ☒ Initials & last names   ☒ Find initials in comments ☐ Match inputted initials with full names   ☐ Search single key in firms ☐ Find inputted singles key in first names and last names ☐ Find small initials (job)   ☐ Last name only   ☐ First name only Search Scope:

☒ Law firm   ☐ Client   ☐ Partner   ☐ Other Parties

Allowed Duplicates:

○ Delete from group A all the names that exit in group B.

● Allow duplicate names between the two groups.

Email input Format:

● Firstname, Lastname@test.com   ○ Lastname, Firstname@test.com

Name Output Format:

○ Firstname Lastname   ● Firstname MI Lastname

○ Lastname Firstname   ○ Lastname Firstname MI

Group A Name Output Order:

● Names in the original order   ○ Names in reverse order

Group B Name Output Order:

● Keep original subgroup order   ○ Recorder all names within group B.

[ Submit ]

FIG. 39

Identity Data Processing Result

Enter Names in Group B:

From: John Smith;
Sent: Novermber 14, 2008
To: Dean Smith; Star L, Steal; Marty, Store; xyz; X.T.; X.Y.Z.; natation11@test.com; ""; "notion009@test.com"; David.Biglow@test.com; David.T.Seth@test.com;t

[Clear Group A] [Clear Group B] [Clear All] [Submit] ◄——862

Sorted Names Output: ——963

Ordered By: first name in alphabetic order ▼

Sorted Names from Group A: ——864

ABC; Bernstein; David Franklin, Esq,; Franklin, Esq,; David Seth; Dean Smith; Blue; G.M. Homes, Esq.*; Gorger Blue; M. Howa, Esq.*; Jack, Esq; Jack Smith, Job; Joe; John Smith, Esq.*; L. Steal; L Strong; Lily Smith; Lisa Black; Esq.; Mary Stone; North ---Select an order---
first name in alphabetic order
first name in inverse alphabe order
last name in alphabetic
last name in inverse alphabetic order Show names in table format Sorted Names from Group B: ——865

| From: | John Smith, Esq.* |
|---|---|
| To: | Darlene Homes; Darlene Homes; Dave Farr; David Biglow; David Franklin; Esq.; David T.Seth; Dean Smith; Dolly Doles; natation11@test.com notion009@test.com; nv9900@tset.com; Sneal,; Star L. Steal; Steven M. Dulles; Store Marty; X.T.; X.y>z.; xyz |

Show names in table format

FIG. 40

| To | Darlene Homes; Darlene Homes; Dave Farr; David Biglow; David Franklin; Esq.; David T.Seth; Dean Smith; Dolly Doles; natation11@test.com notion009@test.com; nv9900@tset.com; Sneal,; Star L. Steal; Steven M. Dulles; Store Marty; X.T.; X.y.z.; xyz |
|---|---|

Hidden names in table format

| ☐ | Sorted Identity Data From Group B |
|---|---|
| ☐ | John Smith, Esq.* |
| ☐ | natation11@test.com |
| ☐ | X.T. |
| ☐ | X.Y.Z. |
| ☐ | xyz |

[Delete Selected Names]  [Add New Names]

FIG. 41

Enter Identity Data for Processing

Enter Names in Group A:                                                    Back

From: Jack Smith; le Storng; Dick; ABC; Job; X.Y.Z.; Jack;
Lisa Black; Greg M. Howa; test2@test.com
Sent :   November 14, 2008
To:  Dean Smith; L, Steal; Gorger.Blue@test.com; xyz;
David Franklin; G. M. Homes; Spade, North; Mary Allen Stone;

Enter Names in Group B:

From:  John Smith;
Sent:   Novermber 14, 2008
To:       Dean Smith; Star L, Steal; Marty Store; xyz; X.T.; X.Y.Z.;
            natation11@test.com; "nv9900@test.com";
            "notion009@test.com";David.Biglow@test.com;
            David.T.Seth@test.com;               —866

[Clear Group A]  [Clear Group B]  [Clear All]   [Submit]

FIG. 42

| Scratch | Attorney Name | Acronym | Priv-Log | Table1 | Table2 | Discussion | Instructions |

Instructions

A. Procedural Guidelines
   1. Project Guidelines
   2. Reimbursement Policy B. Substantive Guidelines
   1. Responsiveness Review
   2. Privilege Review
   3. Case Background
   4. Model Coding Examples C. Reviewer's Tools
   1. Log in
   2. Time Sheet and Payment Histories
   3. Computation Tools

FIG. 43

IE
HTML/Text
  Document view
  To: John Smith
  From: Li Stone

Select and send

To Author
To Recipient
To Date
To SSM
To GSM

Send to all fields 222

IE
Author [ ]
Recipient [ ]
Date [ ]
Special Subject Matter:
[ ]
General Subject Matter:
[ ]

Submit  Cancel

FIG. 44

INVESTIGATIVE IDENTITY DATA SEARCH ALGORITHM

CROSS-REFERENCE TO RELATED APPLICATIONS

This application is a divisional application of allowed U.S. application Ser. No. 12/420,817 filed on Apr. 8, 2009, now U.S. Pat. No. 8,375,028, the entire contents of which are incorporated herein by reference in its entirety.

BACKGROUND OF THE INVENTION

Electronic discovery is a process by which a party produces certain documents required by law or rules in response to a document request or court subpoena. Electronic discovery is frequently used in legal proceedings such as corporate litigation, corporate merger approval, and administrative investigation.

In a typical legal proceeding, a party may, pursuant to rule of procedure, send a document request or a subpoena duces tecum to another party to compel it to produce documents containing any of specified categories of subject matters. Historically, paper documents were produced manually. The responding party reviews its documents, identifies all documents containing any of the enumerated categories of subject matters, and produces them for the requesting party. However, information technology has caused companies and businesses to produce extremely large document pools, and thus reviewing and producing documents by the manual method are no longer practicable. Therefore, a party responsive to a document request has to use a document review platform for document review. Each platform consists of a server and server application and plural terminal computers connected to the server. Many well-known review platforms can be found on Google. Regardless of the platform used for an discovery project, the basic concept is the same. The documents from one or more custodians of the responsive party are collected and stored on a server. If original documents are in the form of hardcopy, they are first scanned and saved as suitable image files which are then loaded onto the server. Certain electronic documents are converted into image file formats such as Tiff, PDF, and PNG. Other electronic documents may be converted into text files by optical character recognizing technique while their native copies are also available for download. Most of the well-known review platforms deliver electronic documents to review terminals in text, TIFF, PDF, or native files and the reviewer at a terminal can choose any of them.

When a document pool contains millions of documents created by large organization of thousands of employees, they contain a large number of people in email and documents. It is often critical for the reviewer or investigator understand the role of the sender and recipients. It is indeed very difficult to keep track of their identities. Moreover, any companies have routinely exchanges email and other communications with other organizations and persons, it is even harder for a reviewer and investigator to keep track of their identities.

SUMMARY OF THE INVENTION

The present invention is a discovery information management system that is intended to solve many inherent difficulties encountered in discovery and case investigation. One object of the present invention is a system by which discovery information can be maintained and shared by many reviewers in real time in the most convenient way. The second object of the present invention is a reliable information system for sharing discovery information that must be as accurate as possible. Another object of the present invention is a versatile information system that does not have inherent limit to its application scope and is highly adaptable to unpredictable changes in discovery processes. Another object of the present invention is a system that offers great flexibility in exporting and importing project data. Another object of the present invention is an information distributing system that can substantially improve document review efficiency by using plural integrated tools. Yet, another object of the present invention is a data entry system, which helps the reviewers enter data efficiently.

The present invention is a discovery information system that is highly configurable. The system may be used for any of mass document production projects or in connection with any of commercial discovery platforms. The system can be integrated into any of the leading commercial review platforms.

The system is highly configurable and can be used to host plural discovery projects. When the system is used to host plural projects, the administrator of the server can use administrator's tools to assign plural manager's accounts to plural project managers. The system also has tools allowing each of the managers to create a project, delete a project, modify an existing project, configure plural database tables, set up additional tables, delete existing database tables, and assign and view project members' accounts.

The present invention is an information system consisting of a server and at least one client computer. The system allows project members or users to add information to plural configurable database tables, validate information via different validation routes and by different validation methods, share information among different users in real time, and process information by using interactive server pads, investigative identity data search algorithm ("IIDS"), identity data processing algorithm ("IDP"), and configurable interactive search and data-feeding function.

In configuring a configurable table, the system has server tools, which allow the manager to select a data validation route, choose data validation methods, and set up data source for any data entry box for any of database fields. Data may be validated on a tentative page or a combined page by manager's data validation method or voting method. In setting up a data source for a data entry box on the data entry form or the Edit Table form, the manager may create a static data source or assign one or more data fields in one or more configurable tables as a data source for the data entry box.

One version of the information management system of the present invention is configured for dedicated use by one single project. In this case, the application is pre-configured with one manager's account, which is used by a manager to set up a project and configure database tables for use. The manager can delete the project, change the project, and reconfigure the project. Another version of the information management system of the present invention is configured to host plural discovery projects that are run independently.

The system of the present invention is also an information system with tools for exporting project data and importing existing project files. The project data from a project can be exported to back up data for later use. By importing a project file into a manager's account, the system is able to render the project precisely in the same way as the system did before the project file was created.

One version of the information management system of the present invention contains integrated tools for resetting all project storage facilities (or all configurable database tables) under any of the manager accounts. Project storage facilities can be reset instantly by one of the methods selected from the group consisting of (a) returning the state of the manager account to the system's default setting; (b) deleting all project data without touching the structures of all database tables; (c) overwriting all table structures by uploading and running a configuration file containing tables structures and necessary definitions; and (d) overwriting specified database tables under the manager account by uploading and running a configuration file containing plural table structures and necessary definitions.

The system provides configurable administrative page, which allows the managers to upload project guidelines, reimbursement policy, and coding samples, and formulas for computing job payment. The manager can distribute information to the project members conveniently.

The present invention is also a method for efficiently sharing information between plural project members or users. The method comprises: (a) adding a data record by a project member into a table as a tentative record, (b) validating the record in a combined table or tentative table by the manager or members' vote, (c) changing the status of the record, (d) moving the data record from the tentative table or the combined table to a validated table, and (e) retrieving the data record by any of the project members for share. Information on this system may be shared by using a simple search method, interactive data retrieving method, investigative identity data search algorithm, identity data processing algorithm, and global search method. As a result, the record created by the member can be found and shared by the rest of the members without the risk of introducing incorrect information into the system.

The present invention is also a method for creating an interactive data entry form in a document review environment with the steps of (a) creating a database table containing a destination field, (b) creating or setting up a data source which may be plural words and phrases ("static data source") or one or more fields of one or more database tables, and (c) associating the destination field with the data source so that when an interactive entry page is generated, it contains necessary script code with parameters for calling the server's interactive search program for retrieving the data choices from the data source. Therefore, the user can reduce keystrokes in entering data. The present invention further comprises methods for constructing phrases by interactively retrieving and selecting data pieces in plural component boxes and combining user-selected data pieces to form a phrase by interactively retrieving plural data pieces in a single phrase-constructing input box.

The identity data search algorithm allows for conducting identity data search in a name table in the steps of: (a) opening a search page containing a search box and plural configuration settings, (b) defining the configuration settings including search ranges and match methods, (c) providing a list of names or identity data in the search box, and submitting the page to the server to conduct an investigative identity data search, and (d) displaying found identity data in a search result page.

The identity data processing algorithm allows user to process identity data in the steps of (a) opening a page containing two input boxes and plural configuration settings, (b) defining the configuration settings including data ranges, output order, and output format, (c) providing a list of names or identity data in the first box and a list of names or identity data in the second box, (d) submitting the page to the server for processing, and (e) displaying the processed identity data in two output boxes in selected output order and format without duplicates between the two output boxes.

BRIEF DESCRIPTION OF DRAWINGS

FIG. 1 shows server administrator's "View Project Managers" page;

FIG. 2 shows discussion board entries under the server's administrator account;

FIG. 3 shows the server administrator's page for assigning project managers;

FIG. 4 shows the manager's page showing left-side menu, with an opened page for changing manager's password;

FIG. 5 shows the manager's "Modify Project Setup" page for changing project global setup;

FIG. 6 shows the manager's "View Project Members" page for viewing project members;

FIG. 7 shows the manager's "Assign Project Members" page for assigning member accounts by direct input and by file upload;

FIG. 8 shows the manager's "Manage Project Shared Account" page for changing the shared account name and shared password;

FIG. 9 shows the manager's "Export Project" page for exporting project data;

FIG. 10 shows the manager's "Import a Project Zip" page for loading project data;

FIG. 11 shows the manager's "Reset Configuration by File" page for resetting project;

FIG. 12 shows the manager's "Set up Tables and Boards" page for setting up, deleting and adding database tables and other information;

FIG. 13 shows the manager's "Create Table or Board" page for creating a database table;

FIG. 14 shows the manager's "Modify Table for Name" page for deleting or modifying columns or adding new columns to the table;

FIG. 15 shows the manager's "Modify Columns for Name" page for modifying a column in the name table;

FIG. 16 shows the manager's page for changing navigation name, table name, data access rule, data validation route, data validation methods, and display scope;

FIG. 17 shows the manager's "Attorney Name Table" in its Validated Table view showing voting data for the record No. 1223, wherein the data validation route is a tentative table;

FIG. 18 shows prior voting information for a data record in the "Attorney Name Table" (the Tentative View) opened from the manager's account;

FIG. 19 shows the member's "Discussion Board" in a conventional view;

FIG. 20 shows the member's "Discussion Board" in an open view;

FIG. 21 shows the detailed message that has been opened from "Discussion Board";

FIG. 22 shows the member's page for posting a message on "Discussion Board" and a pop-up confirmation window triggered by submission;

FIG. 23 shows the member's "Search Member Messages" page for conducting searches;

FIG. 24 shows the member's "Attorney Name Table" (in the Tentative Table view) containing a Vote button and a Revoke button;

FIG. 25 shows the member's "Name" Table in the Validated Table view where the validation route for the table is the combined table;

FIG. 26 shows the member's "Name" Table (in the Combined Table view), where the entries are retrieved from a search operation;

FIG. 27 shows the member's "Attorney Name Table," where the member has just cast votes to three records and is prompted to confirm the member's votes;

FIG. 28 shows the member's "Add Record to Attorney Name Table" for adding new records to the table;

FIG. 29 shows the member's "Edit Transaction Table," where the server provides a list of suggested data pieces 222 in response to the member's keystroke in the comment field;

FIG. 30 shows the member's "Global Search Result" where data records are found from database tables and the discussion board;

FIG. 32 shows the page for conducting investigative identity data search ("name search");

FIG. 33 shows the Setup page for default identity data search;

FIG. 34 shows the identity data search result from submitting identity data search page;

FIG. 35 shows the identity data search result for unmatched identity data that were from a segment marked by "to;"

FIG. 38 shows a page for conducting identity data search, sorting and duplicates-elimination;

FIG. 39 shows a setup page for setting up current identity data search and processing method;

FIG. 40 shows the "Identity Data Processing Result" page and two input boxes for taking new identity data for a repeating operation;

FIG. 41 shows a table that is opened by clicking "Show Names in Table Format";

FIG. 42 shows the page for accepting new identity source data for a repeating operation;

FIG. 43 shows the member's Instructions or Administration page showing the links for viewing project guidelines; and FIG. 44 shows the concept that data are copied from a review browser into a table on a web form with a submission button or is directly sent to a different server by using a proper URL containing the data as a parameter.

DETAILED DESCRIPTION OF PREFERRED EMBODIMENT

Figure 31:
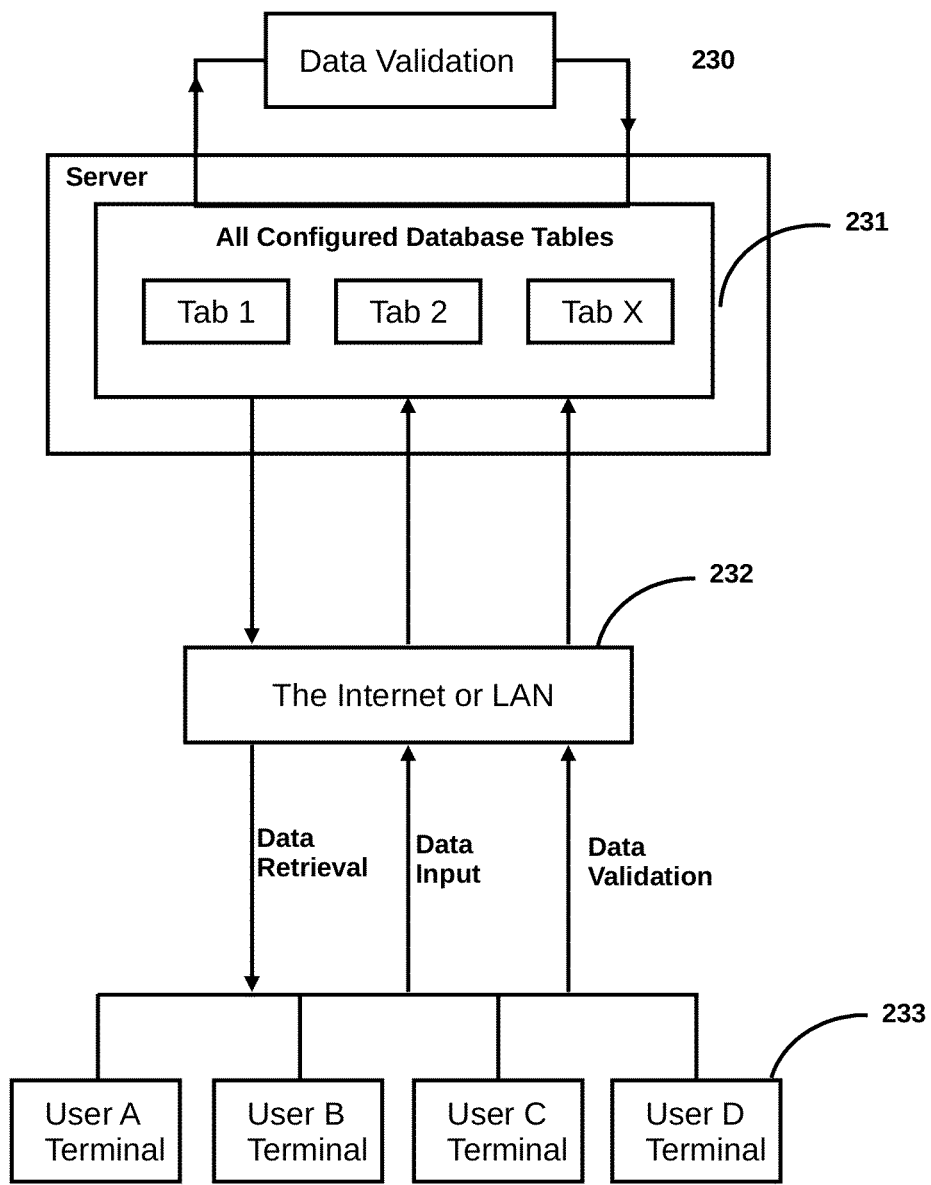
FIG. 31 is a diagram showing two types of data validation methods in relation to data entry and data retrieval for all database tables.
Figure 36:
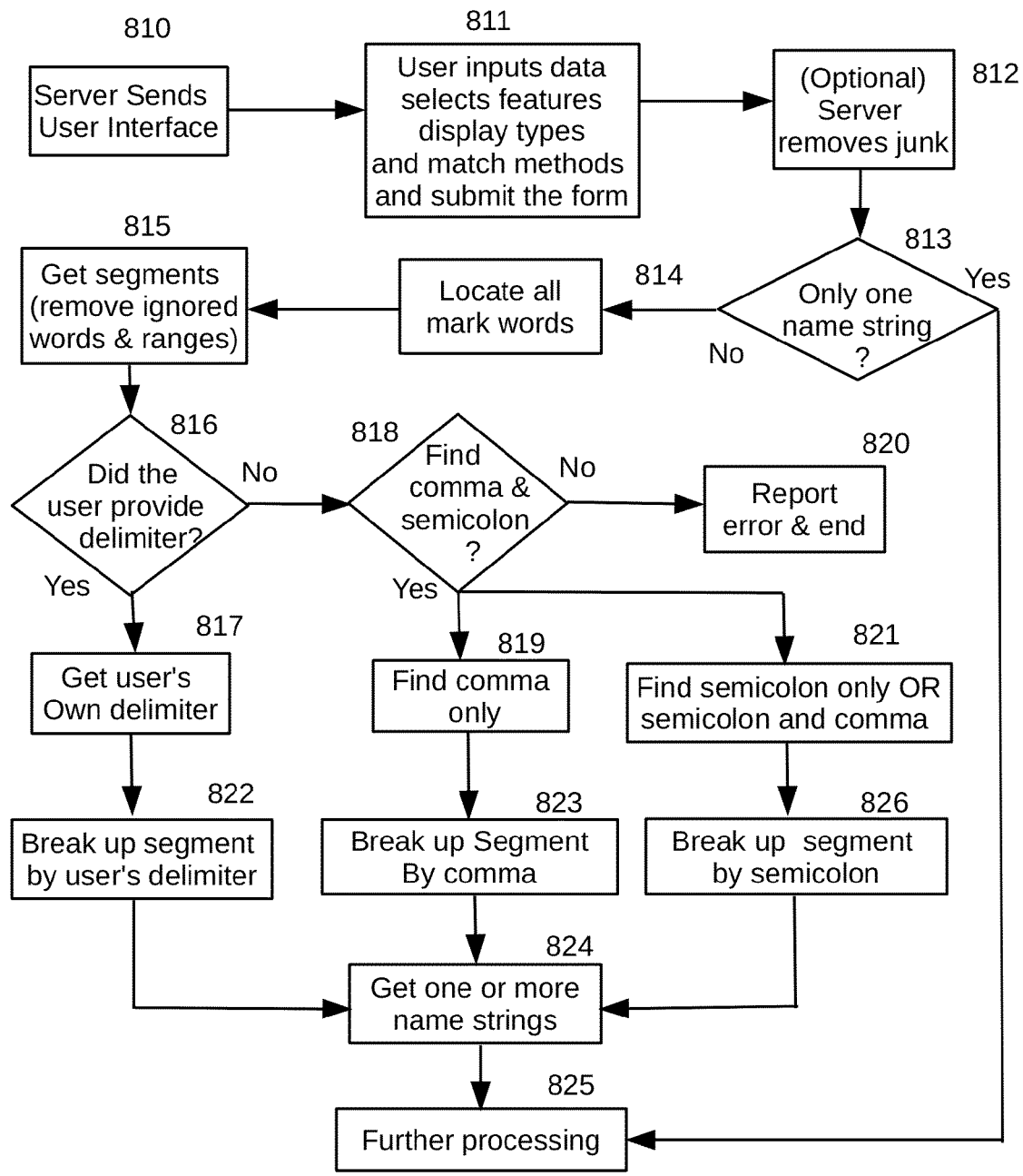
FIG. 36 is a flowchart showing the pre-processing of identity data before conducting an investigative identity data search.

The discovery information management system of the present invention contains the following hardware components.

A. Hardware Arrangement

The system comprises a server and client computers, all of them are connected in a network so that they are able to exchange data using common data transmitting protocol such as TCP. Each of the client computers is able to access the server using WWW protocol and access the web pages sent by the server according to any of current standard HTTP protocols (1.0, 1.1, and 1.2). MYSQL database application is used for managing information. The application source files of this invention include JSP pages, Java class files and scripts under the Tomcat.

A complete database structure has been incorporated in relevant subjects. This database structure does not show any configurable database tables since they can be created and deleted by project managers anytime.

B. Functions for Server Administrator

The system may host plural discovery projects. The system has three different login pages: a login page for the server administrator, a login page for project managers, and a login page for project members.

Each of the projects is run by a project manager and plural members assigned to the project. Each project is totally independent from other projects on the system. No file sharing and data exchanges between the members of two projects are allowed although modification can be made to allow cross-project data sharing for special purposes. In using this system, the administrator first creates accounts for managers. If the server is intended to host N projects, the administrator needs to create N manager's accounts. To create a manager account, the administrator of the server first logs in the server and assigns a project manager with a unique login account and password.

In one version of the embodiment, the table for holding project information may have the fields: group_id int null auto increment primary key, group_code varchar(10), group_name varchar(50), login_method ENUM ('G','P','A'), allow_admin_access ENUM('Y','N') default 'Y', board_status ENUM('T','F') default 'T', pad_record_size int NOT NULL default '500', reg_date timestamp NOT NULL default CURRENT_TIMESTAMP, logindate timestamp NOT NULL default '0000-00-00 00:00:00'.

Upon logging in, the administrator views the default page showing a list of active discussion boards (Each indicates a running project). The administrator can see the assigned managers by clicking the View Project Managers button on the navigation bar (FIG. 1). For each of the manager account entries, the page contains three links: View, Modify and Delete. By clicking the View button, the administrator can view all active project managers except their passwords. Whenever, a project manager has the need for changing password, the administrator can assign a new password and the project manager then can log in and be prompted to change password.

By clicking the Assign Project Manager button on the navigation bar in FIG. 1, the server opens the Assign Project Manager page which is shown in FIG. 3. The administrator assigns only a login name, a tentative password, and an optional email address. The administrator can assign as many manager accounts as practicable by using the page by responding to a prompt for assigning more manager account at the end of each assignment. Whenever the administrator has assigned a manager account and given the login name and password to the intended manager by any arrangement such as phone, email or regular mail, the administrator's duty is discharged. The rest authority of managing projects lies on the project manager.

The administrator can add new manager accounts for more projects to be hosted on the server. The administrator has assigned two project managers (e.g., g-admin1 and g-admin2) (See FIG. 1). After the initial assignment, the passwords are shown in this table (FIG. 1). However, after a manager has changed her password, those passwords are shown in stars (not shown in the figures). If the administrator clicks the View link for a manager, the server opens a page. On this page, the administrator can view the information about the manager: Login name, account password, company, manager's initials, legal name, full address, phone number, email address, and IP address used for change the password. The initials are used for the convenience of managing the project. The password is displayed as stars if the manager has changed the password. By clicking the Modify link (FIG. 1), the server generates a page containing editable fields (except IP address) that are filled with original account information. The administrator can use this page to update any of the fields except the IP address, which is automatically filled when the manager resets the password. The administrator can also reset password for the manager by changing only the password and it could cause the manager to change password again. The administrator can also delete any of the manager accounts from the server. If the manager account has been associated with a project, the administrator is advised of the effect of the deletion and prompted to type in "yes" in a pop-up window to confirm its intention. After the deletion, all projects associated with the manager's account are inactivated so that no members are allowed to access the project. The project data are not be deleted by this operation alone. It is preferable to allow the administrator to create a compressed encrypted file using the project password so that the project data may be reloaded for future use. The administrator is not allowed to access project files. It is assumed that the project manager has properly deleted or archived the project data by using its own tools before the manager account is arranged for deletion. Additional back-end tools may be used to delete abandoned and unclaimed project data.

The project members on a project collectively run a discussion board and many other database tables ("data tables" or "configurable tables"). The discussion board may be used for various purposes. The administrator can view the discussion board (same as in FIGS. 19-20) for a project just like the members, if the administrator has been granted the right to access to project data. The discussion board may have condensed view and expanded view. By clicking the "Open View" or "Conventional View" button, the administrator can view the discussion board's pages which are substantially same as those shown in FIGS. 19, 20. Any of the managers can prevent the administrator from accessing the project data of the project by using the manager's setup page. If the project manager does not want to grant the right to access to the discussion board to the administrator, the administrator cannot see those pages. The server administrator has the power to control the right of the manager, but has no right to directly control administrator's right to access to projects. While the administrator can reset the manager password, the project manager will know this action upon next sign in. This feature ensures that the system is safe in various litigation environments that require different levels of security.

If the project manager has to change its login name, the server must keep track of manager's association with the project and project data. This can be achieved by using a manager ID as an association field and the server will use it. If there is a need for assigning a new manager account as a replacement account, it is possible to change the field in project data so that the project data is associated with the new project manager. The system is implemented so that each project may be associated with plural manager's accounts and all managers can manage the project by rotation.

In addition, the administrator may also send and receive email from any of the project members on the server by using the page invoked by pressing the email button (FIG. 1). This function is intended for communications related to the system's downtime and all issues that are related to the server's performance and operation hours. The detailed layout for the email function is similar to that for project members. When this page is opened, there are three sub-menu items: Send Messages, Sent Messages, and Received Messages. Clicking the Send Message link invokes a page for sending new message. By clicking the Sent Messages link, the server shows a table showing all sent messages. The fields on the table include recipient name, subject, files attached, and sent date.

For each of the email entries, a check box is also provided. In addition, some buttons such as "Delete" and "Move" are placed on the top or bottom of the table so that the administrator can delete any of the email messages. Additional features such as "Find" and "Sort" are available. The page showing received messages is the same as the page for sent messages except that each of email messages is listed by using sender name, subject, attached files and received date. Deleting, archiving, sorting and finding functions may be implemented as the popular web mail program in Yahoo, MSN, and other vendors.

Other functions inherent to the administrator role are that the administrator can suspend, archive, and delete projects. However, the server administrator must go through a series of steps of authorization before such operations can be performed. In order to suspend an on-going project, the server administrator must fill a certificate, which states that a notice has been sent to the project manager on certain date and a response has been received, and provides a statement for deletion. The administrator fills the certificate before deletion is allowed.

If the administrator wants to delete an obsolete project or archive a finished project, the administrator is prompted to provide information on the status of the project and the time lapse since the closing of the project. The server deletes the project only after the administrator has provided satisfactory answers. Before deletion is performed, the administrator is asked to consider archiving the project data for off-the-system storage. The administrator can use an export tool to archive the project. When the project is archived, the administrator gets a compressed project file. A project manager who has the project file may render the project on this or another system. In the alternative, the administrator can periodically dump project data by using mysqldump or equivalent command of the database application. The dumped file may be stored on an independent system or storage media as history files.

It is understood that the system may be modified to allow the administrator to configure and manage projects. In this case, the manager would be in the administrator's position to set up one or more projects. In the simplest implementation, the server may be designed to host just one project.

C. Functions for Project Managers

The person, who has a manager account, can log in the server by using assigned login name and password. After the manager logs in the server, the manager can set up a project and configure one or more data tables for use.

1. Manager's Password and Account Information

Upon logging in, the manager is prompted to provide basic contact information including his last and first names and his initials for identification purpose. However, it is understood, any other notations and numbers and strings may be used in lieu of the initials. After the password is reset, the manager is allowed to access all functions and features of the system concerning the project.

2. Manager's Tool Bar

On the manager's home page (FIG. 4), there are a topper menu 200, a navigation bar 202, and a global search box 201. The topper menu bar 200 contains a list of links: Name Search|Full Screen|Email|Setup Project|Setup Tables|Log out. "Name Search" is for invoking a page for conducting identity data search. "Full Screen" is for calling the search page using a full screen view where the page top contains only the user's identity, a search box with a submission button, and a link for returning to the normal view. When full screen page is called, a larger number of records can be displayed.

"Email" is a link for calling the page for viewing and sending email. The manager is allowed to send email to only administrator, co-managers, and any project members. "Setup Project" is a link to be used to set up the project. "Setup Tables" is a link to be used to set up the tables and modify current default tables, which include Notes, Transaction, Attorneys, Acronym, Table1, Table2 and Server Pad. The names for the default tables can be changed. The setup tables page also contains an embedded link for creating new tables so that additional tables may be created if the default tables are not sufficient.

3. Set Up Projects by the Manager

When the manager signs in for the first time, the manager has an opportunity to setup a project. The manager is first prompted to provide only certain critical information.

On the Setup Project page (FIG. 4), there is a left-side menu 203 for nine functions: Change Manager's Password, Update Manager's Account Information, Modify Project Setup (FIG. 5), View Project Members (FIG. 6), Assign New Members (FIG. 7), Manage Project Shared Account (FIG. 8), Export Project Files (FIG. 9), Import a Project Zip (FIG. 10), and Reset Configuration by File (FIG. 11).

The project manager can set up a new project by using a page, which is substantially the same as the Modify Project Setup page in FIG. 5. On the Create Project page, the manager is prompted to enter or select values for project or group full name, project code, shared login name, shared password in duplicate, login methods, global data validation route (also "data validation page"), pad's record size, and administrator access right. Data validation route and pad's record size are assigned with project-wise default values, but the values can be changed for each of the tables. Default data validation route is entered by selecting a value on the drop-down menu while the administrator's access right is set by clicking one of two mutually exclusive buttons. Although the form shows six items, only project full name and project code (or a project short name) are required, but this convention can be varied.

Member login methods could be implemented by default and data validation route could be defaulted to any of the two methods. Three login methods shown on the page include (1) group or shared method, (2) personal or private method, and (3) combined methods. When a personal login method is set up for use, each of the project members has his or her login name and password. In this case, the project member can access all features and functions intended for all the members. When the group or shared method is used, all project members can log in and access the project data by using the common login name and the common project password. In this case, the project members cannot use personalized features such as email, account management, server pad, and time sheet.

To keep track of activities on the project, the IP address is recorded for each message on the discussion board. For example, a message posted by a shared account contains the header information: "Member Name: SHARE|Post Date: Feb. 25, 2009|IP: 192.168.41.10." For other tables, a record submitted by a project member to a table in its tentative view from a shared account is identified as "SHARE" in the initials field. On the manager's account, "SHARE" is a link for displaying the sender's information. By clicking "SHARE", the manager can see Login Name: Share, and IP address. While some fields may be empty, IP address and member initials (i.e., SHARE) are always recorded by default. The information allows the manager to ascertain the identity of the sender if necessary. When both login methods are used, any project member can log in by using the common login account or his personal account. When a project member logs into the server by using a common account, all functions intended for personal use are unavailable. When a project member logs into the server by using a personal account, the project member can use all features and functions intended for all members of the project.

By using the Modify Project Setup page (FIG. 5), the manager can also change and update project full name, project code, member login methods, data validation routes (via a tentative table or via a combined table), and the right of the server administrator to access project data. If project data validation route is a tentative table, all new data records are shown on the tentative table while only validated data records are shown in a validated table. If data validation route is a combined table, all new data are entered into the combined table where all validated records and tentative new records coexist. However, all tentative records in the combined table are marked in a different color and look. If the project member wants to view only validated data records, the project member can open the validated table. The combined table allows a project member to search both validated or tentative records at once. When a tentative table is used, the project member must conduct two searches, one for the tentative table and one for the validated table. However, search tools for both validated and tentative data records can be implemented to cross the two table views, but this implementation may be confusing. A search, which initiates from a page for one type of data records but include data records from another table view, can confuse project members.

By using the "Update Manager Information" menu, the manager can change or update his account information. The manager can also assign accounts for plural associate managers or project leaders so that they have the same privilege as the manager's account except that an associate manager does not have the authority to assign new accounts to other associate managers.

While the present implementation allows the server administrator to access only the discussion board, the access privilege can be extended to all other tables. This may be necessary when server administrator is a manager partner of a law firm. In addition, the manager can also determine whether the administrator is permitted to communicate with its members by email. If this communication is disallowed, the administrator can send email to the project manager who can relay the email to project members.

On the View Project Members page in FIG. 6, the manager can also view, modify and delete any of the project member accounts by clicking a respective link in the links 204: View, Modify and Delete. Clicking the View link for a member, the server opens a page for viewing the member's account. The account information page shows login name, password, company, member initials, member name, address, phone number, email address, and numeric IP address, and a bottom Modify button. The Modify button is associated with the same page that can also be opened by clicking the Modify link on the View Project Members' page. The page for modifying a member account contains editable boxes for all fields except the box for the IP address field.

In one version of the embodiment, the member table may have the following data structure: usr_id int not null auto_increment primary key, group_id int, login varchar(20) not null unique, password varchar(20) not null, email varchar(50), prefix varchar(15), abr varchar(5), firstname varchar(20), MI varchar(5), lastname varchar(20), title varchar(20), address varchar(50), city varchar(20), state varchar(2), country varchar(20) default 'USA', company name varchar(20), zip varchar(10), phone varchar(12), reg_date timestamp NOT NULL default CURRENT_TIMESTAMP, logindate timestamp NOT NULL default '0000-00-00 00:00:00', role ENUM ('MG','CM', 'MB','PMG') default 'MB', member_status int default '0', ip varchar (15).

On the Assign Project Members page in FIG. 7, the manager can assign a new member by assigning a login name and a password by using the input boxes 205. After the manager provides name and password for a member and submits, the manager is prompted to assign more member accounts. The manager can repeat this process until the manager has assigned all necessary accounts. In assigning login name and password for each of the project members, the manager may use a text file containing login name and password pairs in the file to upload account information quickly by using the file uploading path 206. The file may contain the following data: "person1, 111111; person2, 222222; person3, 333333." The name-password pairs may be delimited by a carriage return or semicolon. This method allows the project manager to assign project members quickly. Upon successful upload, the server sends the page for showing project members. If the uploaded file is not of a right type or the data in the file are not in a proper format, the server responds with an error message. From the displayed result, the manager immediately knows if accounts information has been uploaded successfully.

In an alternative implementation, the system may include a program for generating passwords for a list of user names automatically. The program must ensure that an identical login name is not assigned to two members. Also, it is preferable that the system avoids assigning identical passwords to two accounts. This program can be further modified to improve efficiency. The project manager first collects a list of email addresses from project members to be used as associated email addresses. The manager provides this email address list to the server by direct input into a large input box or by uploading a text file containing the address list. The server then generates a login name and tentative password for each of the email addresses, and sends an invite message containing the login name and temporary password to each of the email addresses. The message may contain a link for accessing the newly created account or an instruction on how to access the new account. Each of the members will be prompted to change password when the member logs into the account for the first time.

4. Navigation Bar and Common Table Features

The default navigation bar 202 contains Notes, Transaction, Attorneys, Acronym (or Production since the name can be changed), Table1, Table2, Discussion, Pad and Instructions (FIG. 4). The default tables can be changed by changing the data which are used to generating them.

All of the navigation buttons except the Discussion and Pad buttons are associated with data tables and those tables may be deleted by using the Setup Tables page. Table1 and Table2 initially are not in use. If a user clicks any of them, the server responds with a message that the table has not been set up for use. Not all of the tables are useful in each discovery project. When a table is deleted, the original name on the navigation bar is replaced with "Table#" (where # is a numeric number) implying that it is not set up for use.

Figure 17:
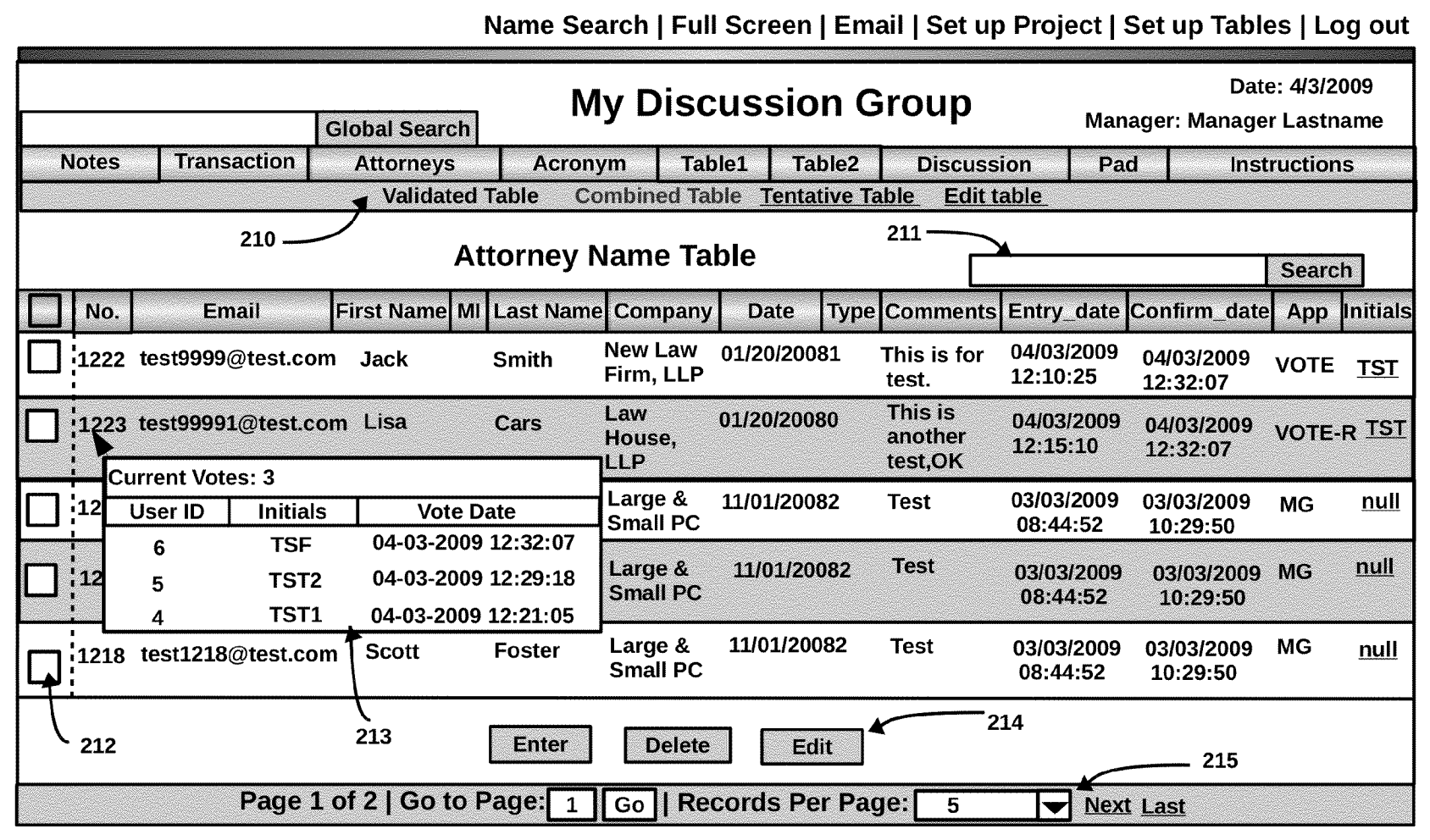

All of the configurable tables have a view-selecting tool bar (same as the view-selecting bar 210 in FIG. 17), which allows any user to select different views: Validated Table, Tentative Table or Combined Table, and Edit Table. While the web pages are also referred to as tables, the data on different views of a table actually come from the same database table. Each of the tables has table name (i.e., a title), a search input box 211 at the top, the table body capable of displaying plural data records, and plural buttons 214. The number of fields and their types depend on the setup of the tables. The Validated Table has an Enter button, which allows the member to invoke the page for entering data for the table. Each of the column names on the web page is also a link for sorting data records. By clicking a column name such as "Events", "Date" or "Comment" in the transaction table, the user can trigger a script function to call the server program to send the page with the selected column as a sorting key. Therefore, the server can send the data records that are sorted by any of the configurable and non-configurable fields.

Data Validation route determines where data records are validated. If a configurable table is setup with a tentative table as data validation route, the tentative table shows only tentative data records while the validated table shows only validated data records. The tentative table is referred to as validation page. If the table is setup with a combined table as data validation route, all validated and tentative data records show up in the combined table, while the validated table shows only validated data records. The combined table is referred to as validation table. The tentative table and the combined table have a check box 212 on the left of each of the data records and have plural processing buttons 214 below the table.

The number and functions of the buttons 214 on the validation route depend on the validation method for the table and account owner's status. If the table is set up with manager validation only, the buttons on the member's validation page consists of "Enter," "Delete" and "Edit." The member's ability to edit and delete records depends upon the data access rule. The buttons on the manager's validation page include "Enter," "Delete," "Edit," "Validate" and optional "Validate All." The manager uses the "Validate" button to validate data records. The manager is allowed to delete and edit data records on the validation page while the member's right to delete and edit data records is limited by the data access rule.

If the table is set up with voting validation method, the buttons 214 on the member's validation page includes "Enter," "Delete," "Edit," "Vote" and "Revoke". The member can edit records according to the data access rule. The manager page has the same buttons because the manager does not need to validate any data records. The manager may cast votes like any member. The buttons 214 are placed on the tentative table or the combined table, depending upon the data validation route that the table uses.

If the table is set up with both manager's validation and voting validation, all six buttons "Enter," "Delete,", "Edit,", "Validate,", "Vote," and "Revoke" are placed on the manager's validation page. The manager can validate data by both validating data records and voting on data records. Five buttons "Enter," "Delete," "Edit," "Vote," and "Revoke" are placed on the member's tentative table page or combined table page, depending upon the validation route used for the table. The manager is allowed to delete and edit data records on the validation page while the member's right is limited by the data access rule.

Despite the complex of the buttons, all tables must allow the users, manager or members, to enter and edit data records; the manager is allowed to delete any records on both validated table and validation page, but each of the members is allowed to delete his own tentative records if the data access rule is set for private edit or delete any of the tentative records if the data access rule is set for public edit; the manager uses the Validate or Validate All button on the validation page to validate data records while each of the members uses the Vote and Revoke buttons on the validation page to cast vote or retract vote; and all validation buttons are placed on validation tables where data records are validated.

The validated table for a given table is intended to hold validated records. Therefore, the members are not allowed to delete or edit any validated records. However, the manager sometimes has the need to delete or edit even validated records. The buttons 214 on the manager's page include "Edit" and "Delete".

If the manager wants to have members to rework on certain data records, one way the manager can do is to change the statuses of those data records so that they are routed back to the validation table where the members can edit. If a rework project is to be done by all members, the manager may change the data access rule to pubic edit. After the members edit all the data records, the data records are then validated and routed back to the validated table. To further increase the flexibility, a body of back-end tools is developed to manipulate data records and their statuses. Those tools allow the manager to find records and change statuses at once, mark data records with different values in certain fields to indicate their significance.

All pages have a page number navigation bar ("page number navigation controller") 215. It has an input box to enter a page number to show and a drop-down box for changing the number of records per page (FIG. 17). "Page 1 of 2, Go to page [ ] [GO]: Records per page [5] per page: Next Last," where [ ] denotes an input box, and [Go] means a button. The manager or member can go to any page by typing a number in the input box and then clicks the Go button. The drop-down box right after "Records per page" allows the user to change number of records per page. The default numbers may be 5, 15, 40, 60, and 100. The last two words are links that allow the manager to go to next page or the last page. However, those links become "First," "Back," "Next," "Last" if the server displays any of the pages in the middle range. When the servers displays the last page, those links become "First" and "Back." The page navigation controller is placed in all configurable tables on all views, email table, and discussion board in all views, for any accessible users, including administrator, project managers, and project members. It is also used in all search results pages that are used in the system. The page number navigation controller shows up only when the retrieved data records cannot fit into the displayed area.

The manage can use any of the configured tables or default tables including server pad in the same way as any project member does.

5. Set Up Tables

The page for Setup Tables and Boards (FIG. 12) has by default seven entries, respectively, for Notes, Transaction, Attorneys, Production, Table1, Table2, and Pad Each of the first five entries is followed by five links: Data Entry, Modify Table, Delete Table & Backup Data, and Advanced Setup. The Setup link next to Table1 and Table2 can be used to open the page for setting up the tables. The Modify link for the Pad entry allows the manager to change the record size for data in the pad. The database table for the discussion board is not configurable.

After a project is set up, all tables are fully functional except table1 and table2. The manager can modify any of the default tables on FIG. 12. The two tables may be set up as production log or hot-document log. If the project requires more tables, the manager can use the Setup more table link at the right bottom for creating more tables. All six tables are same or similar in their functions from the management point of view. Therefore, most discussion revolves around the third table ("Attorneys" or "Name Table"). It may contain an optional display scope field.

In implementation, all configurable tables are tracked by a table: Head (board_id int auto_increment primary key, group_id int, navigation varchar(15), board_name varchar(20), board_status ENUM('T','F') default 'T', has_records ENUM('Y','N') default 'N', validation_method ENUM('0','1','2') default '0', votes int, access_rule ENUM('0','1') default '0', create_date timestamp NOT NULL default CURRENT_TIMESTAMP). Board_status is for validation route: T for tentative table, and F for combined table; Validation_method is for validation method: 0 for manager validation, 1 for voting validation, 2 for both manager validation and voting validation. "access rule" is for the data access rule: 0 for private edit and 1 for public edit.

The Data Entry link is for invoking a page for adding records. This page is similar to the member's page for adding records in FIG. 28 except that it has different fields. The page for attorney's name table includes the following fields: email address, first name, middle initial, last name, firm or company, dates, type, and comment. "Date" means date ranges. "Type" is used to indicate whether a person is a party's attorney, opposing attorney, client's employee, or other third party. "Comment" stores important information concerning the attorney or person. It may include its special nickname, initials, or other description relating to the attorney or person. At the bottom, there are two buttons: "Submit the Record" and "View the Table." The manager may submit the page containing filled fields to the server. If the server finds no error, the server writes the record, and responds with a success message at the top of the same data entry form while the previous data are cleared. The manager can enter another record. If the server encounters an error, it responds with "Data were not saved because they contain wrong data types or were too long in size."

If the manager clicks the View the Table, the server sends the page for showing the Tentative Table if the table is set up with a tentative table as validation route, or the Combined Table if the table is set up with a combined table as validation route. Its function is discussed in the member section. The page for any of other configurable tables is similar to this page except that its field number, field types and field names are different.

The manager may delete or modify any of the tables. Any of the tables can be deleted using the Delete Table and Backup Data link in FIG. 12. Upon clicking this link for the Notes table, the server presents a page titled "You can delete the Notes and/or backup the data for the table" followed by four choices: (1) Back up the data and then delete the table; (2) Delete the table without saving its data; (3) Back up its data only, but do not delete the table; and (4) Go back to the previous summary page. When the data backup is required in an operation, the server extracts the data and writes the data in a delimited text file or copy the data into a database table for archival. After a table is deleted, a Setup link is automatically placed next to the table like the Setup links next to Table1 and Table2. After a table is deleted, the manager can recreate the same table or a different table by clicking the Setup link next to the table location.

To create a new table, the manager clicks the Setup link (FIG. 12) to open the page which is shown in FIG. 13. This page contains two input boxes at the top: one for navigation button and one for table name, and two buttons: "Insert Entry" and "Delete Entry." Below these two buttons, the page by default shows one data input row for accepting the definitions of the first field or column of the table. The input boxes in the data input row are respectively for field name, type, length, not-null, and uniqueness.

On the Create Table or Board page, the manager initially sees only one data input row for creating one table column. By clicking the Insert entry button once in FIG. 13, it generates one more input row. If the manager wants to create a table containing five columns, the manager needs to create additional four input rows by clicking the Insert entry button four times. If the manager has created too many input rows by mistake, the manager can delete the last row by clicking the Delete entry button once, and can delete as many rows as necessary by clicking the Delete entry button repeatedly.

In creating a new table, the manager first enters a word (such as "Attorney_Name" or "Name") to be used as the name of the navigation button corresponding to the table to be created. This value is to be saved in the special database table Head intended for storing the information about all configurable tables on the server. The manager then provides another word or phrase such as "Names" to be used as the table name, which is also used as the title of the web page for displaying the table. The field name should be one single string without any space. In addition, some words and phrases that have been used by the system cannot be used as a table name.

The manager needs to define all fields. The manager provides a field name and the length. The field name should contain no space and special characters. The types of the field available in the drop-down menu include integer, tiny integer, char, varchar, double, year, date, time, and date and time. Additional type of fields can be added. The manager needs to use correct data types. "Not null" is a check box, which may be selected if the field cannot be null. Uniqueness is also a check box, which may be selected when the value in a field to be created must be unique, as in case of a field for email addresses. The manager needs to understand when a field cannot be null and when the unique box should be checked.

After the data are provided with correct checks, the form is submitted to the server for processing. If the operation is successful, the server shows the page Setup Tables and Boards page with information about the newly created table in it. If the server encounters error, it responds with "Error: The system was unable to create table, and this may be due to some wrong fields."

The structure of any of the tables can be modified. By clicking the Modify Table button on FIG. 12, the server generates a page titled "Modify Table for [Table Name]" (FIG. 14). The structure of the attorneys name table could have eight rows of data corresponding to eight fields: email address, first name, middle initial, last name, firm or company, dates, type, and comments. Each row contains a field name, type, a null flag, and a uniqueness flag. There is a check box in front of each of the rows and there are three buttons at the bottom: Delete, Add, and Modify.

If the manager selects a column (e.g., Last_Name) and clicks the Modify button, the server sends a page titled "Modify Columns for Name" for editing the selected field in FIG. 15. This input row is substantially same as the input row used in the creating new table except that all input fields are filled with the original values. Upon submission, the server updates the table structure to reflect the modifications of the field. To add a new field, the manager clicks the Add button in FIG. 14, the server sends a page titled "Add Columns for [Table]". This page looks like the page in FIG. 15 except that it has the Insert row and Delete row buttons for adding or removing plural fields. After the field names are provided and their types and flags are set, the page is submitted to the server. If the new fields are added successfully, the server responds with the same page except that it has newly inserted fields appended at the end of the table. If the manager deletes a field from a table containing data, all of the data in this field will be lost. The manager is reminded with the risk of losing data. If the manager confirms the deletion, the field together with data will be deleted.

By clicking "Advanced Setup" on the Setup Table and Board page in FIG. 12, the server sends a page titled "Change Navigation Name, Table Name, Access Rule, and Validation Route, Data Validation Method, and Data Display Scope." The manager can change the navigation name (FIG. 16). On this page, the manager can set up or change data validation route with a tentative table or a combined table. The use of data validation route is discussed in next subsection. The manager can also select data validation method in the drop down box. Data validation methods include Manager validation, validation by vote ("voting validation," "member validation"), and a combination of the two methods. When the manager validation method is selected, the system allows the manager to validate newly entered data records for the table. If the voting validation method or the combination methods is selected, the page opens an input box right below the drop-down box to prompt the manager to type in a numerical value (see FIG. 16). The number is the number of votes required to validate each tentative record. The creator of the data record is not counted as a vote by default. If an inputted number is a reasonable integer smaller than the number of members on the project, the system accepts and uses the value as vote threshold for the table. If the number is not good, the server prompts the manager to provide a new number.

On the page in FIG. 16, the manager can also set up or change data access rule. The choices are private edit or public edit. Private edit allows the owner of a record to edit it before it is validated. Public edit allows anyone to edit tentative records. After a record is validated, it cannot be edited or deleted by any member. The manager, however, can still edit it.

6. Export Project Data

To securely protect data real time, the system provides tools that allow the manager to export project data in both a native format and a human-friendly format.

As shown in FIG. 9, there are two methods for creating a native project zip. The server extracts all necessary project data and saves them in suitable format. This can be done by using database application's dump tools. The whole project database can be exported by using such tools. The file is then encrypted and compressed to form a native project zip. After this file is decompressed and decrypted, it can be imported back to the same database to overwrite existing database having the same name. However, any other information stored in program property files must be taken care of separately.

The second method allows for exporting a whole project or any of the tables that the manager wants. The manager can select any of the tables to export data. When this method is used, the program extracts data from selected data tables and save them in one root folder. Project files may be saved in a folder with different sub-folder structures. The file is then encrypted and compressed to form a native project zip. When project data are archived by this method, most of the files are human-friendly, and can be read after they are decompressed and decrypted. However, all attachments from one single database table are saved in one single file and cannot be opened off the system. Therefore, it is impossible to access all attachments off the system. The project zip file can be imported back to the same database to overwrite existing database having the same name or by other identification methods. Any other information stored in program property files must be treated properly.

It is desirable that project data are exported in a user-friendly format in some cases. As in creating a native project zip file, all project data are retrieved from the server and saved in a project root folder. In creating a user-friendly project zip file, the server first extracts basic information ("group properties") such as owner identity, project name, project password, member list, member accounts and passwords, project table setup data, and writes them in one or more text files. The server extracts posting dates and times for web mail messages and attachments from relevant tables and saves the data in a text file, extracts posting dates, author identities, and client IP addresses from the discussion board table and saves data in a text file; the server also extracts data from each pad table and saves them in a text file. All of those files are in well-delimited text format, and may contain file names of attachments. They contain the same substantive information that is shown on the discussion board, email page, and other tables.

The message bodies of the email messages are saved as plural text files in one sub-folder, and the message bodies of the discussion messages are saved as plural text files in another sub-folder. The server also extracts discussion board's attachments and saves them in original native formats in a sub-folder, and extracts email attachments and saves them in original native formats in another sub-folder. Each of the attachments may be renamed by a message ID or appended with a unique string or its posting-date and time so that no name conflicts exist. The root project folder is then encrypted and compressed as a project zip file. This human-friendly project file can be opened and viewed without using system's software.

8. Import Project Data

As shown in FIG. 10, a project zip file can be imported back to the system. The system allows the manager to (1) replace all existing tables and data by the tables and data from the import file or (2) import selected tables from the project file. When the second method is selected, the manager can further choose to (a) import table structure and data, (b) replace existing data in the table by imported data for the same table, and (c) update data in the tables (i.e., keep original data records, overwrite old records by updated or modified records, and add new data records to the table).

The native project zip file can be uploaded into an active manager account for rendering by using the link "Import a Project Zip." As shown in FIG. 10, this page allows the manager to import the whole project or affect only selected tables. In importing part of projects, the manager can select tables in 207, select an importing method in 208, and select a project file for upload (in 209). The process for rendering a project includes (1) uploading the compressed file to a temporary folder on the server by data stream, (2) unzipping and decrypting the project file using the key provided on the uploading page, if it is encrypted, and (3) retrieving data from the files and writing the data into the database tables. The server knows the locations of all individual files within the root folder. If table structures are imported, they are written in the Head table. After the project file is rendered, the project behaves in exactly same way as it did before it was exported.

If the manager has access to the server, a project zip file may be loaded on the system locally by using an equivalent server program, which may be invoked on the server's terminal. In this case, the command may be like "pimport project-file-path." The program in response prompts for project password. Upon receiving a correct password, the program decrypts the zip file, reads data from the resulted files, and writes data into relevant database tables.

9. Reset Configuration by a File

In reality, it may be necessary to change the whole projects table structures as quickly as possible. This can also be done by uploading and executing a configuration file. The manager's "Setup Project" page has the button "Reset Configuration by File." Upon clicking this link, the server sends a page for uploading a configuration file. The configuration file contains plural blocks of data in the form of "table_name; navigation_name; table_structure (statements for table structures)." The statements inside the brackets may be a SQL statement or special plain language. The entire row is referred to as a block of definition data for a table. If the statements are in a plain language, they must be translated into a SQL statement for creating a table. It is obvious that a table name and a navigation name may be the same, and any one of the two fields may be eliminated as long as the program knows the convention.

A shown in FIG. 11, on the page for uploading a configuration file, the manager has the options to (1) restore all project settings to system's default, (2) delete all project data from all tables including email and the discussion board, (3) reset selected tables by a configuration file, and (4) reset all tables by a configuration file.

If the options 1 and 2 are selected, the manager needs to do nothing else to control. The option 3 is used to reset the tables selected by the manager. By using this option, only selected tables are overwritten by the table structures that have identical table names in the configuration file. The system first uploads the file and reads the information about table names, navigation names, and table structures. The system tries to overwrite selected existing tables with the table structures having the same name. The configuration file may contain N blocks of database tables. If the manager clicks the first and fourth tables for being overwritten, the server purges the first and fourth tables and recreates table structures by the table-structures with identical table names in the configuration file. Thus, the table structures can be modified with data deleted. If no identical table exists on the configuration file, the program returns a warning message.

The tables listed for selection are the existing tables under current project. The manager may choose to delete data from selected tables without touching table structures. The manager may also replace selected tables by the table names and the table structures from the configuration file. In this case, all data in the selected tables are deleted. If suitable data blocks do not exist for an operation, the system responds with an error message. If plural tables are to be created, the system may create them by using the tables and structure data in a sequential order: the first block data are for the first selected table, and the second block data are for the second selected table. In this case, the operation affects only the selected tables. The manager can preserve existing tables and data by not selecting the tables. Even if the manager chooses to create new tables, the system will not delete any of the existing tables that are not selected.

When the manager selects the option 4, the manager browses the client computer to find the file path of the configuration file. Upon submission, the server uses the data on table structures on the configuration file to overwrite a specified number of tables on the server. The system has preset default 5 tables. The manager is allowed to change this number between 1 and a reasonable number. If the number of tables on the configuration file is fewer than the number of tables on the system, the system returns a warning, and rewrites the tables with the available tables in the configuration file. In this case, the system overwrites only part of the tables in the order from left to right on the navigation bar. The maximum number of tables a configuration file can reset is the system limit. All existing tables, including those without overwriting table structures, are purged from the system.

Plural pre-built table configuration files may be prepared for site use. The configuration files may be customized for different cases that may arise from Foreign Corruption Practice Act, securities law, patent law, and antitrust law. Different cases require very different table structures and information management strategies. This feature allows the manager to change over table structures on site in seconds. Before any of such operations, the server reminds the manager to save current project data by using the export function. If there is a need to change the system back to the old system's table structures, the manager can upload the backup project zip file.

10. Set Up Interactive Data Entry Function

The manager can set up interactive data-feeding function for any of the tables. The system has two types of fields: a destination field to which data are provided in response to keystrokes on their data entry page, and the data fields that provides source data. The interactive data-feeding function must be embedded on a data entry page. The input box corresponding to the destination field is referred to as "active input box" or "active input field." In addition, the system also has a database table or file that defines the relationship between a destination field and its data sources fields. This database table, which may be a file, is referred to as setup table.

An active input box on a data entry form on a web page may use a fixed number of phrases, data pieces, or partial data records from other data tables as data source. For example, when the task is to produce a privilege log, possible privilege factual bases may include "communication from attorney", "communication to attorney", "work product prepared in anticipation of litigation", "communication from legal staff", "communication to legal staff", and "confidential communication reflecting legal advice." Therefore, it is desirable to use those phrases as data source for a privilege basis field for the data entry form for privilege log. Those phrases can be put into a static file or saved in a database table. When the member moves the mouse to the active input box on the data entry page, it causes the server to retrieve those phrases and display them as selectable choices in a dynamic selection box.

Another function is to associate one of the database fields with one or more fields of one or more database tables. For example, a privilege log normally has a column containing attorney names. Most of the attorney names may be found in another table, an attorney name table. Therefore, it is desirable to use the attorney name table as the possible data source for the input box for the attorney name field of the privilege log. Whenever a member moves the mouse to the active input box and types a letter, the server searches the attorney names in the attorney name table, finds all names that match the typed letter, sends the found names to the client computer, and displays them in the selection box for the active input box. When one more letter is typed in the input box, the server conducts another search, and returns a reduced number of attorney names that match the typed letters. The server can quickly narrow down choices, allowing the member to select a proper entry.

Referring to FIG. 14, the manager can set up a data source by clicking "Data Source" for any field in the selected table. In response, the server opens a page titled "Set up Suggestion Source for Table: Privilege-Log, Table Field: Attorney_Name". On this page, there are two radio buttons for two mutually exclusive choices (1) Build static source and (2) Select tables and fields. There is a large input box below the first choice. There are plural tables and plural fields for the second choice. Each of the table names are preceded by one first-level check box while each of the field names is preceded by one nested-level check box so that the manager can select any of the tables and any of the fields for each of the tables.

If the manager wants to use static data source under the first choice, the manager clicks the radio button for static data source, types plural phrases separated by semicolon or carriage return in the input box, and submits the page to the server for processing. Upon receiving the data from the submitted form, the server retrieves the data and saves them as one data record in the setup table. The server also enters other instructions on defining the interactive search in the setup table. If source data are originally saved in a normal database table, the server retrieves the source data, breaks up the data by delimiter, and saves them in the setup table. The server enters a record containing information about the active destination field and data source in the setup table.

If the manager wants to select one or more fields of one or more tables as data source, the manager first selects the radio button for the second choice that is at the top of the page. The manager selects check boxes for one or more tables as data source, and, for each selected table, checks one or more nested check boxes for available fields. Plural tables and fields are allowed. For example, the manager may select the first-name and last-name fields of the attorney name table and the comment field of the transaction table as source data. Upon receiving the setup data, the server then writes a record in the setup table. The principle for using the interactive search function is same as in the case of using static data source: In static data source setup, the data source may be written as one single string containing delimited data pieces while in the non-static case, the data source is plural database fields of plural tables. In the later case, the searchable records in the data source may change from time to time. The server retrieves partially matched data records from a growing data source, and presents retrieved data records in the selection box for the active input box.

Database tables and fields to be used as data source for any input field may be selected in the Setup Tables page. One example setup table is: table suggest_source (board_id int, field_name varchar(50), static_source varchar(5000), tabl_source varchar(5000), field_source varchar(5000), PRIMARY KEY (board_id, field_name). In this table, "board_id" stores unique ID number of the table. "Field_name" is for storing active destination fields to which responsive data are provided. "Static_source" contains static data choices separated by proper delimiter; "Tabl_source" contains table names separated by proper delimiter such as semicolon; and "field_source" contains field names separated by proper delimiter. The number of choices in the tabl_source field and the field_source field are identical so that after they are broken up to form two arrays of strings (e.g., string table[i] and string field[i]), the same index number would define the same sources. The value in the tabl_source means only one table name, but the value in a field may include plural field names separated by comma (i.e., "first_name, last_name, comment"). Setup can also be done by uploading a file containing proper data.

If the system uses a static file to track data source, a definition in a file may look like "2:field1=table1.field2, table2.field1, table2.field2" where the first "2" is the table id, "field1" is an active destination field, and plural terms after the equal sign denote the table names and field names of data sources. Project ID or board ID is used so that the same file can be used to track data sources for database tables for plural projects on the server.

The interactive data feeding function between an active destination field and a data source is implemented by using a setup table, a script-code generator, and a server's back-end search program and Ajax technologies.

The script-generating program is a server program, which is able to generate script and embed it on a data entry page containing any active input box. The script may be a universal program, which can be used by any active input box with its ID (e.g., name) or an individual program for a fixed field. In this case, plural programs must be embedded for plural active input boxes. In addition, the server also generates a listener's statement for each of the active input boxes.

When the server is called to generate a data-entry page for a table, the server checks the setup table or the equivalent file to determine if any of the fields in the table is listed as an active input box. For each active destination field, the server searches for static data source and, if the source exists, uses the static source. If static source does not exist, the program searches for table names and field names. If nothing is found, the server responds with a null or warning message. If the setup is saved on a file, the server checks the file to find active input boxes and their data sources. The server generates script to be embedded on the data entry page only for active input boxes and a listener statement for each of the input boxes for the active input boxes so that user's action of typing triggers the running of the script. If a field is not set up with a data source, no script will be embedded for this field on the data entry page.

The script contains data source as hidden parameters. When the script is run, it calls the server's search function with search key and data source (i.e., table names and field names) as parameters. When the member types a key in the input box, this typing action triggers the script to run and calls the server's search function with search key and the data source as parameters. Therefore, the server gets both the search key and the data source, conducts a search, retrieves responsive data, and sends the retrieved data to the browser in background. The retrieved data are shown in the selection box for the active input box. The interactive search and feed feature is also used in the server pad.

If the data-entry form has a second active input box, tying in a key in the second box would call a script to call the server's search program with its search key and its own table names and field names as parameters. Thus, the server searches different tables and fields, retrieves responsive data, and sends the retrieved data back to the browser in background.

11. Set Up Phrase Construction Method

A phrase construction function allows the project members to construct simple sentence or phrase on a data entry form or Edit Table page. The manager can set up this function for any of the database fields as a destination field. In setting up this function, the manager needs to determine the destination field, the total number of components, construction method, and retrieving method, which determines whether data choices ("data pieces") are retrieved alphabetically or according to typed letters. In addition, the manager must provide data choices for each component that uses static data source. The general steps are as follows:

First, the manager selects a field as the destination of constructed phrases. The setup page shows all tables and all fields for each of the tables so the manager can select one of the fields as a destination field.

Second, the manager provides a numeric number to define the number of construction components. If a phrase consists of four data pieces from four fields, the manager should enter 4.

Third, the manager selects a construction method from one of the two choices: interactively retrieving data in plural component boxes or interactively retrieving component data on a single construction box by sequential keystrokes. When the first method is selected, the input box is shown as a disabled input box, and four component boxes are shown below the disabled input box on the data entry page. Each time when a key is typed in a component box, the browser shows a selection box and the server feeds data pieces to the selection box. This disabled input box is not necessary, but useful in providing preview of constructed phrases. When the second choice is selected, only one construction box is shown on the data entry page, but the browser shows plural dynamically generated component boxes. If the construction method uses two data components, the browser must show selection boxes twice, and the member gets the component data directly from the selection boxes. Not every component box accepts a data source and some components may accept manual data entry.

Fourth, the manager selects a data entry form or an Edit Table form to embed the construction function. Same construction function can be embedded on different data entry forms for the same destination field of a table. Different construction functions can be on different input boxes for the same destination field.

Fifth, the server promotes the manager to define data source for each of the component boxes. If the manager has chosen the component construction method, the manager for each component defines data source as (1) manual data entry, (2) a static data source presented in alphabetic order, (3) a dynamic data source presented in alphabetic order; and (4) a dynamic data source retrieved in responsive to typed keys. The principle for showing suggested data in each of the component boxes is same as the interactive data feeding function discussed above. A static data source is saved in a single database field of the setup table while a dynamic source is one or more database fields holding a growing number of data records. Any of the database fields may already have been assigned with a data source. If a component box uses a field that has already had an active data source, the manager may use the same source or use a different data source.

Assuming that a primary field "type" has a static source of "A, B, C, and D" associated with an input box. When the member types in the box for this field, the server feeds the input box with "A, B, C, D." A component box on a construction box may also need the "type" data. The component box needs same data source (i.e., A, B, C, and D) or its own static data source such as E, F, G, H as potential "type" data. The data entry box for the primary field should be placed before the component box. A script can be embedded on the page for copying the value from the primary box to the component box. In this case, the search and feeding function is not necessary for the component box.

If the manager has chosen a single construction box as the construction method, for each component, the manager may choose (1) manual data entry, (2) a static data source presented in alphabetic order, (3) a dynamic data source presented in alphabetic order, and (4) a dynamic data source retrieved in responsive to typed keys. In addition, the manager also has the opportunity to select a keystroke such as control as the key for sequential advance.

After a construction function is set up, the setup information is saved in a setup table. When a member calls the page containing the construction method, the server embeds all necessary script code with necessary parameters for calling the server program for retrieving data source or conducting interactive search. The construction page also contains code for appending the selected data pieces with separator space to form a phrase and code to save the formed phrase in the destination field.

The manager also has tools for setting up a background construction method. In this case, the manager is allowed to define a destination field, the number of construction components, and the identities of all component fields that are normally on the same table. If a data component is in a different table, its value must be unique (cannot have two records providing values). The manager can call the server tool to retrieve the values from all of the fields and append them with a preceding space in a string variable to form a complete phrase and save the formed phrase in the destination field.

12. Setup Other Features

The Instructions page allows the project manager to post and update project information, including project guidelines, reimbursement policy, substantive review standards (responsiveness and privilege standards), case background, and model coding examples. The data may be saved in a non-configurable database table, which may contain the fields: ins_id int auto increment primary key, group_id int, ins_name enum('project', 'reimbursement', 'responsiveness', 'privilege', 'case_background'), content MEDIUMTEXT, attachment int). Its related attachment table may have ins_id int, attach_id int, file_name varcha(50), file_path varchar(100), content MEDIUMBLOB).

The manager can upload or type in data for each of the topics by using the Update link next to the topic. According to the well known method, the page opened from this link has a title corresponding to the topic, a large input box for entering data, a file path browse (with "add more file path" link and a dynamically generated "fewer file path" link) for uploading one or more files using the same method used on many other pages. The manager can provide text in the large box with or without attachments. Upon successful submission of the page, the topic is set up.

If a member clicks any of the topics before it is set up, a pop-up window shows up, informing the member that it has not been set up for use. After the topic is set up, the member can open the topic by clicking its name. If an attachment is embedded for a topic, the member can download the attached file by clicking the attachment name.

13. Data Validation by Manager

Data validation route and validation methods determine where data are entered and how data records are validated.

When data validation route is a tentative table, data records enter into the database table through a tentative table as tentative records (See the data records in FIG. 18). Upon data validation, their statuses are changed so that they appear on the validated table, and disappear from the tentative table. When this method is used, it is easy to keep track of all validated records and tentative records. The other validation route, known as "combined table", allows new records to enter the combined table that shows both validated records and tentative records. However, the two kinds of data records are displayed with different colors in the number field and different values in the APP field. All data records are stored in the same database table with different values in their validation status so they can be retrieved in different table views. They could be stored in two different database tables. This data validation route is useful in the case that the member is interested in seeing all data records, regardless of their validity. When a record is validated in the combined table, its status is changed, it appears in the validated table, but remains in the combined table as a validated record.

Data validation method determines who has the authority to validate data records. There are two methods: manager validation and voting validation. If a table is configured to use the manager validation method, only the manager or associated managers can validate data records. If a table is configured to use the voting validation method, a data record can be validated when a predetermined number of members have voted in favor of the data record.

A table can be configured to use both manager validation and voting validation methods. In the setup, the manager can select one of the three choices: Manager validation only, voting validation method only, and both validation methods. Also, two validation routes can be used simultaneously for a table so that validated records are in the validated table, tentative records are in the tentative table, and both of them appear on the combined table.

The process of data validation for a table depends upon its data validation route and its data validation method. If the table is configured with a tentative data page and the manager validation method, the manager validates tentative records and data validation is performed on the tentative table (FIG. 18). On this page, there is a search box at top, the body of the table in the middle, and four buttons: "Enter", "Delete", "Edit" and "Validate" (This table also has the Vote button and the Revoke button because this table is set up with both validation methods). A check box is placed in front of each of the data records.

To validate data records, the manager selects data records to be validated by checking their check boxes and clicks the Validate button at the bottom. The browser responds with a pop-up window to confirm the intention. Upon confirmation, those checked records are validated, and they disappear from the tentative table and appear on the validated table. After records are validated, they cannot be edited or deleted by the member who created them. In implementation, the values in their status fields are changed upon validation, the data records are retrieved, and the page is updated. If the manager does not agree with a record, the manager can delete it by checking the corresponding check box and pressing the Delete button. Deletion is performed by the server upon the confirmation of the intention on a pop-up window. On the page in FIG. 18, the Enter button is for calling the data entry page for the table. The Enter button disregards the states of check boxes in front of data records. The Enter button could be placed in any suitable place.

The Edit button on the Manager's tentative table (or the combined table) is for calling the page for editing any of the tentative records by the manager. Upon editing, the initials of records' creator are changed by attaching "-R". For example, "TST" will become "TST-R" indicating that the record, created by TST, has been edited by the manager. The Edit page opened from a validation table may contain both validation and editing functions, and thus the manager has an option to edit the record only, validate the record only, and edit and validate the record. When a record is both edited and validated, "-R" is attached to the creator's initials, and manager's initials are added in the APP field.

If the database table is configured with a combined table route and manager validation method, the manager can validate data records by using the similar operations on the combined table rather than on a tentative table. In this case, the combined table contains both validated and tentative data records. However, they are displayed in different ways. Each of the validated data records in the attorney name table has a black number in the number field and a manager's initials in the APP field. In contrast, each of the tentative records in the same table has a red number in the number field and an empty value in the APP field. Any other suitable methods may be used to mark the two kinds of records so that they are distinguishable. The manager can find all tentative records by using the local search function at the top of the table if the manage knows the records. The manager can also use the page number navigation controller at the bottom to reach the pages where tentative records are.

After the manager finds tentative records on the combined table, the manager checks the boxes for those records, and clicks the Validate button. Upon confirmation by a pop-up window, those records are validated, and show up in the validated table while remaining in the combined table as validated records.

After a record is validated, project member cannot delete it. The manager can delete it by checking the corresponding box and clicking the Delete button at the bottom. Deletion is performed by the server upon the confirmation of the intention on a pop-up window. The Enter button is used to call the data entry page for the table without regarding the selection of check boxes for data records.

An Edit button is placed next to the Enter button on the combined table so the manager can edit any of data records just as the manager does on the Tentative Table and the Validated Table. As in the tentative case, the initials of the creator of the data record is appended with "-R" after the manager has edited the tentative record. The data record remains in the combined table. Thus, "TST-R" under the initials field means that the record is created by TST, has been edited by the manager, but has not been admitted as a validated record. If a data record is both edited and validated by the manager, the manager's initials are added to the App field and "-R" is appended to the initials of the original creator. Thus, "TST-R" under the initials field means that the data record was created by TST and was modified by the manager while manager's initials under the APP field means that the record has been validated by the manager.

If a data record in the Validated Table is edited by the manager, the value under the APP field is attached with "-R." The "MAN" or "VOTE" thus becomes "MAN-R" or "VOTE-R" respectively, depending upon its validation method. As shown in display box 213 in FIG. 17, the record No 1223 was originally created by TST, it was validated by three votes by TSF, TST1 and TST2. After the record was admitted as a validated record, one of the managers again edits the data record as revealed by "VOTE-R".

14. Manager's Email.

The manager also has the page for sending and receiving email from and to administrator and its project members. The Send Messages page contains sender identity, a drop-down box for selectable recipient names, an input box for subject, and an input box for message. In addition, the page also contains a link "Add more filepath" for sending an attachment, which accepts common file extensions such as pdf, jpg, txt, and doc. One more box for accepting a file path is generated by clicking this link once. On the Sent Message page, the manager can also view all sent messages that are shown by recipient name, subject, attached files, and sent date. The subject is also a link, which is associated with a page for displaying the whole message. Each of the messages is preceded by a check box. The manager can delete any of the messages by checking on the box in front of the email and clicking the Delete button at the bottom of the page. The server deletes the checked message upon the manager's confirmation on a pop-up window. The Received Messages page shows all received messages that are docketed by sender name, subject, attached files, and sent date or receiving date. By clicking the subject name, the server opens the Details of Message for viewing the email message. On this page, there is a Delete button and a Back button. The manager can delete this message by clicking the Delete button. The message is delete upon confirmation of the intent to delete.

D. Program Functions for Project Members

The access right of each of the project members is granted by the project manager as discussed above. In order to sign into the server, the member needs to use project code, login name and password to log in. Upon signing in the server using personal account for the first time, the member is prompted to change or update account information. In this version of the embodiment, the member is required to provide email address, initials, first name and last name. Upon submission, the server automatically generates a database table for storing data for the member's server pad.

1. Member Account Management

The member's home page contains a topper menu bar: "Name Search|Full Screen|Email|Manage Account|Log out" (FIG. 24). "Name Search" is for invoking a page for conducting identity data search. "Full Screen" is for conducting a global search using a full screen view. "Email" is a link for calling the page for viewing and sending email. "Manage Account" is for calling the page for managing the member's account.

When the member logs into the account for the first time, the server prompts the member to change password. After the member provides a good password and submits the page, the server prompts the member to log into the account again. The member can change password and account information any time as described below.

Below the topper menu bar is the status information of the member: today's date, project code, member name (the first and last name). In the center is also the full name of the project.

By clicking the Manage Account link, the member can change or update his account information on the Personal Account page. On this page, there is a swap-able link for changing password. The form contains input boxes for email address, prefix, first name, middle initial, last name, title, company name, street address, city, state, zip code, country, and phone. Email address, first name, last name and initial are required in this version of the embodiment. All of the fields are filled with original data from the database table, but the member may amend any of them and submit the page to the server. Upon submission, the server responds with a message informing the member of successful modification of the account information.

By clicking the Change Password link on the Personal Account page, the member opens the page titled "Change Password." The member provides old password and new password in duplicate, and submits the page. If the operation is successful, the server responds with the message "Password was modified successfully! Please login your account again." Otherwise the server responds with an error message. On the top of this page is also a link "Change Account" for going back to the page for updating member account information.

2. Global Search

Right below the project name is an input box for conducting global search. When a search key is typed in this box and the page is submitted, the server searches through all configured tables, member's server pad table, and discussion board, and retrieves all records matching the search key. A search result from a global search is shown in FIG. 30. Plural search keys separated by space are allowed and are treated independently. The retrieved data records are arranged by the tables that have matched records. On the result page, the member can select the first table by selecting the drop-down box 227. In addition, the member can select an ordering method from the choices available for the selected first table in the drop-down box 228. If data records from the discussion board are displayed first, the ordering criteria are ID, email, phone, issue, IP, post date, search key, and content.

3. Discussion Board

The member may open the discussion board and read any of the messages (FIGS. 19-23). The discussion board has two views: open view and conventional view.

The conventional view is shown in FIG. 19. On this view, each of the subjects is a link for opening the details of the message and the table has link 216 for submitting a message and searching messages. In the conventional view, each of the message entries shows subject, date and owner's name. An opened message is shown in FIG. 21. The discussion board in an open view is shown in FIG. 20. An attachment would be on the extreme right just below the dotted line. The server starts downloading attachment upon clicking its name. When there are plural attachments, they are placed on the web page side by side without using delimiter (attachment2.txt attachment2.xls). The rest of the functions and features are substantially same as the open view page.

A table for holding data for the discussion board may include the fields: id int auto_increment primary key, group_id int, user_role varchar(10), user varchar(45), email varchar(50) not null, phone varchar(13), ip varchar(15), post-date timestamp NOT NULL default CURRENT_TIMESTAMP, issuer varchar(255), search key varchar(100), content MEDIUMBLOB. The related attachment table may have the fields discuss_id int, attach_id int, filename varchar(100), filecontent MEDIUMBLOB.

When the discussion board is in the open view, it shows each of the messages in one section of the page: subject in the first line, the author information on the second line, the body of the message and attachments at the end. The author information is in the form of "Member Name: MAN|Post Date: 02-26-2009|IP: 192.168.1.10". The attachments are shown as links on the right just below its message body (FIG. 20). Each of the attachments can be downloaded for view by clicking its name. There are two links at the very bottom of the page: "Submit Message" and "Search Messages." The user can click the first button to invoke the page titled "Send Member Message" for submitting a message and clicks the second button to invoke the page titled "Search Member Messages" for conducting a search.

A member can submit a message to the discussion board by using the page titled "Send Member Message" in FIG. 22. To post a message on the discussion board, the member clicks the Submit Message button. This page contains data input fields respectively for subject, search keys, optional member's name, email address, optional phone number and a large input box for accepting a message. The search keys provided by members are not to be shown on the discussion board, but stored in the database table as search keys. There is a link at the bottom "Search Messages." There is a link "More Search Keys" which allows the member to create more boxes for taking search keys. Below the large input box, there is a link "Add more file path." Clicking this link once causes the browser to create a file path box with a browse button and two links: a link "Remove file path" next to the created file path box and a link "Add more file path" below the file path box. The file path is for accepting a file with a common extension. The member can remove this file path box by clicking the link "Remove file path" or create more file paths by clicking "Add more file path." Therefore, the member can upload as many attachments as necessary and practical. After the member fills in the data in all required fields, the member submits the page. In response, the browser responds with a confirmation message. Upon confirmation of intention, the message is sent to the server and written into the proper database table.

A search page, which has been opened by clicking "Search Member Messages", is shown in FIG. 23. There are two search methods. At the top is a simple search method by using message's subject. This method allows the member to find all messages containing the search key in the subject line. The second method allows the member to set criteria for conducting a search. The first criterion is message's subject. Leaving this input box blank will cause the server to ignore this criterion and to include all possible subjects. Providing keys in this box narrows down the scope of possible hits. Search range can be further narrowed down by date. The member may use any date or specify a specific date range. In addition, the search page contains a link "More Search Key." By clicking this key once, one more search-key box is generated which is followed by a button "Fewer search key" for deleting the input box. The search keys entered on the web page are matched with the search keys in the database. Leaving the search-key box blank causes the server to ignore the search keys in database. Data records are found and returned that meet all of the criteria specified on the search page.

4. Data Tables

The member may use any of those data tables such as Notes, Transaction, Attorney Name, and configured Table1 and Table2. All of them are designed essentially in the same way. Except table1 and table2, all of the tables have default table structures so that they can be used without configuring.

The use of the configured tables can be demonstrated by examining the functions of the "Name" table (e.g., an attorney name table). This table is used in typical privilege review. When a member encounters an attorney name in a document, the member enters the name into this table by using the Enter button (FIG. 24). If data validation route for this table is a tentative table, a new record first enters into the tentative table. This record is view-able and retrievable in the tentative table. The record is also searchable by all members on the project using the global search function, but its unverified status is clearly indicated. When a record is displayed with a red record number in the result of a global search, the record is a tentative one. FIGS. 25, 26 show respectively a validated table and a combined table for a name table.

Unlike the manager's page, the initials on a record on the member page is not a link so other members cannot view the detailed information about the member who has created the record.

As discussed in the section for project manager, two validation methods are used for validating data records. The process of validating data for a table by vote depends upon validation route for the table. If the table is set up with a tentative table, data validation is performed on a tentative table; and if the table is set up with a combined table, data validation is conducted on a combined table. A record is admitted as a validated record when a predetermined number of members have voted for the record. The project manager can set and change this predetermined number.

Figures 27, 28:
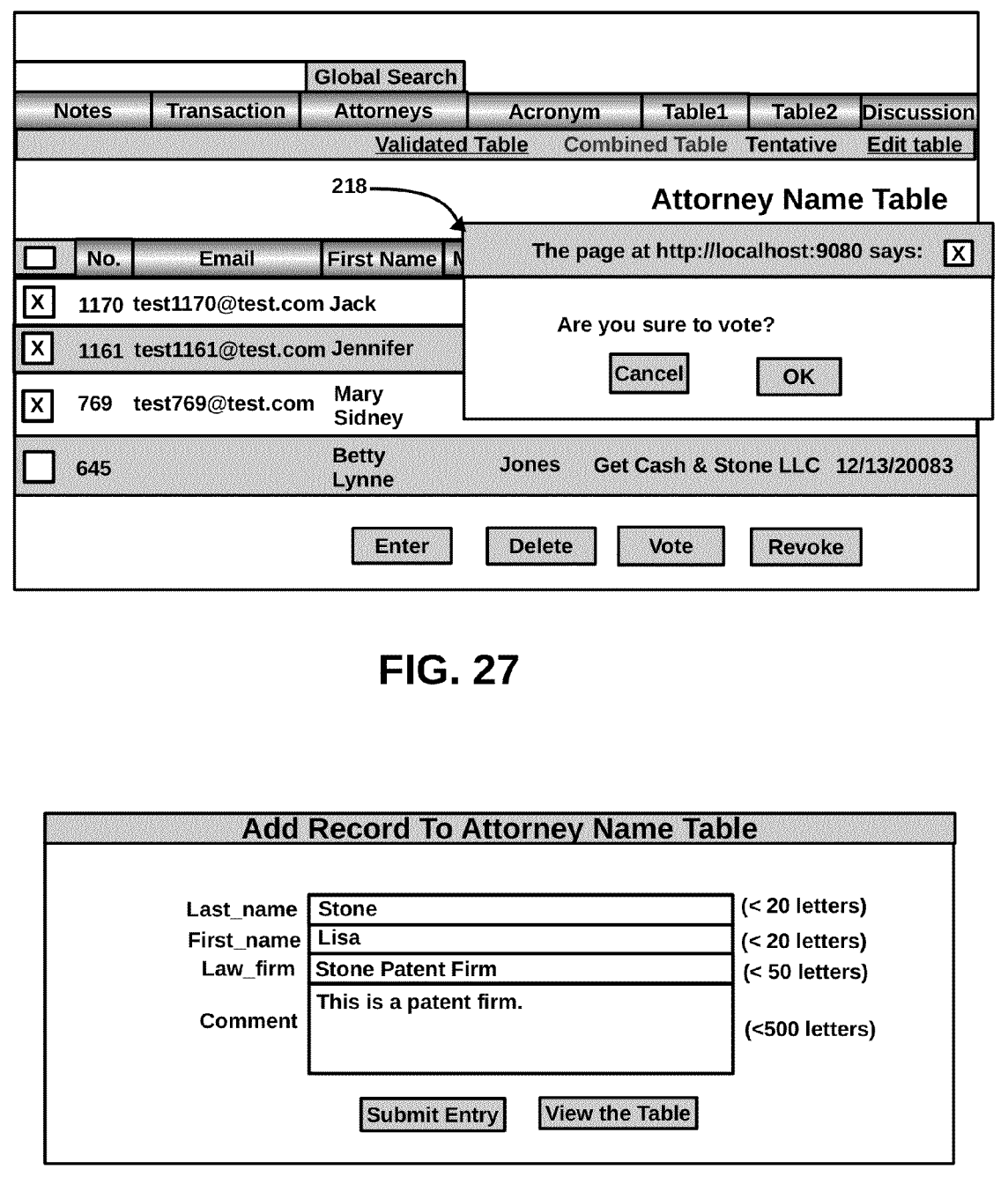

When a table is set up with voting validation method and a tentative table (FIG. 24), the tentative page contains a search box at the top, a body of the table, and four buttons at the bottom: Enter, Delete, Vote, and Revoke. There is a check box on the far left column on the table header and there is a check box in front of each of the records. To cast a vote on a record, the member selects a record by clicking the front check box, and clicks the vote button (FIG. 27). The server takes and saves the vote after member's confirmation of intention (See the dialog pane 218). The number of the records on the web page becomes green so that the member knows this is a record the member has voted on. The member can revoke his or her vote before this record is admitted as a validated record. Upon being revoked, the number of the record becomes black again on the web page. Two more members, member B and member C, also cast their votes on this record in the same way on the tentative table under their own accounts. When the last of the members successfully cast the vote, the status value of the record is changed. The record disappears from the tentative table, and appears on the validated table. If the member opens the validated table, the member can see that the newly validated record is marked with VOTE in the App field and date and time in the confirm_date field. If the manager opens a validated table, the manager can see all members' votes by clicking its record number (FIGS. 17, 18). The identities of all voters can be ascertained from their initials. Therefore, the manager knows who has voted for this record. One database table for holding record status in one version of the embodiment may contain the following fields: board_id int, record_id int, usr_id int, vote_status ENUM('0','1','2','9','10') default '0', [where 0=no action taken", 1=voted, 2=revoked, 9=validated by manager, and 10=validated by vote] vote_date varchar(500), revoke_date varchar(500), access_date varchar (500).

If both voting validation method and manager validation method are used for the table, extra buttons "Validate" and "Validate all" are placed on the validation page under the manager account. The manager can cast vote on a record as a member, or validate a data record directly.

If the data validation route is a combined table, the process for validating records by voting method is substantially the same as in the case of using a tentative table except that all votes are cast on a combined table rather than on a tentative table.

The data-validation process is illustrated by the flowchart in FIG. 31. On this chart, four terminal computers 233 are connected to the server 230 through LAN 232. The server in this illustration uses only three database tables 231. Any of the members can input data to any of the tables and retrieve information from any of the tables through the network connection 232. Any of the members can validate data by vote for any of the records entered by any of the other members. When a data record is validated, its status is changed. As a result, the data record appears on the validated table view. In addition, the manager is able to validate tentative data directly.

5. Edit Table

A function, known as table edit or Edit Table, is provided for editing plural data records in a table view. The system provides two kinds of data access rules: public edit and private edit. If the table is set up with public edit, a member can delete any of the tentative records by using the Delete button. If the table is set up with private edit, the member can delete only the member's own tentative records but is not allowed to delete the tentative records created by other members.

To edit tentative records in any of the configurable tables, the member clicks the Edit Table button and calls the page for editing data records (FIG. 29). This page allows the member to delete any record, create a new record at the end of the table, enter data for a newly recreated input boxes for a record, copy data from an existing record and paste the data onto any existing record, and update the data in the database table.

On this Edit Table page, there is a search box 219 at the top on the right side, the body of the table contains plural rows of data records, and a link "Enter Record" 221 right at the end of the body. Each of the data records may have plural data values or units, depending upon the table's setup. Each of the data values is shown in one editable input box. If a record in the table has five fields, it has five editable boxes. On the left of each of the records, there are three very small menu icons 220, respectively, for copy, paste, and deletion. Each of the icons indicates its function whenever the mouse is moved over it. For example, if the mouse is moved over the first icon, the browse shows "Copy" below the mouse's arrow. At the bottom are two buttons 223: "Save Changes" and "Discard Changes." The page also has a page number navigation controller. The column name is also a link for calling a sorting function using the field as a sorting key as implemented in other web pages for all configurable tables.

When access rule is set to private edit, a member can edit only his own records on the Edit Table page. Therefore, it is impossible to overwrite any data records of other members. The access rule is applicable to specific tables and their relevant views. To delete a record, the member just clicks the deletion icon on the left of the record, the record will be deleted from the table, but has not been permanently deleted from the database table. To enter data at the end of the table, the member first creates a row of input boxes for accepting an empty record at the end of the table by clicking the "Enter Record" 221 at the table bottom. The member can type data into the boxes for the record and save the record by pressing on the Save Changes button. If the member wants to copy data from an existing record to this empty record, the member clicks the copy icon on the left side of the record, and pastes the data onto the empty record by clicking the paste icon for the empty record. Of course, data can be copied from any existing record and pasted onto any of the exiting records. Selecting individual data fields is not necessary for copying and pasting a whole record. However, the member can copy data from one data field to another by the conventional method of selecting and copying data and pasting the data to where the mouse is.

To make permanent changes to the database table, the member clicks the Save Changes button. All changes are saved. If the member does not want to save the changes, the member can click the Discard Changes button. The data in the web table are not written into the database table. Use of the search function 219 will cause the server to retrieve the original data records, reconstruct the web page, and thus cause the client computer to discard the changes. Preferably, conspicuous instructions are placed on the web page to warn the member that navigating pages, conducting a search, and sorting data records will cause the server to discard all changes made on the table. In the alternative, a script function is implemented to throw a warning message whenever the member tries to use the searching or sorting function or to change the page number after the data on the table have been edited.

6. Interactive Data Entry Feature

Any of the data fields may use a static data source or one or more table fields of one or more of configurable tables as a data source.

Assuming that the input box for the comment field on the edit table page for the transaction table has been set up with fixed data choices as a data source. The data choices 222 include "draft agreement," "public record," "press release," "personal communication," and "email," The member uses the Edit Table page to enter data. When the member creates an empty record and moves the cursor to the comment field and types, the server sends all the retrieved data choices and displays them in a dynamic selection box below the input field. If the member moves the cursor to the phrase "Personal Communication" in the selection box and releases it, the phrase is copied into the active input box. If the data source contains a large number of records, the member can progressively narrow down data choices.

Assuming that the manager has set up both transaction table and Notes tables and used the event field of the Notes table as the data source for the event field of the transaction table, when the member types in the input box for the event field of the transaction table, the keystroke causes a script program to call one of the server's search programs with the key, table names, and field names as parameters. The server program searches the event field of the Notes table, retrieves all data that match the typed letters, and displays them in the selection box for the member to select. The member can select any of the suggested data pieces as input data. If no data record is found, the member can type in suitable data manually. This function not only increases data entry efficiency but also improves data consistency.

Due to the setup feature, it is extremely flexible to use. Moreover, the project manager can change the data source for any active destination field any time by changing the data source. It is preferable that the selection box has a page number navigation capability or scroll bars when the total number of suggested data choices is excessively large.

7. Phrase Construction Methods

The phrase construction function is useful in building production logs and privilege logs in a typical discovery setting. In building a privilege log, some common entries in a descriptive field may look like:

1. [letter] [from counsel] {concerning} [corporate litigation];
2. [Memo] [to the counsel] {concerning} [patent application];
3. [An analysis] [from counsel] {concerning} [corporate business];
4. [Spreadsheet] [prepared at the request of counsel] {concerning} [corporate litigation].

Each of those short phrases is intended for a particular document under review. Each of the words in the same order position is referred to as a component, which may be stored in a database field. After a short phrase is constructed for a document, the phrase is entered into a description field (i.e., "destination field") of the record associated with the document. In those examples, each of the phrases has four components: first word or phrase normally indicates document type. This component perhaps has fewer than 20 choices. The second component has only a limited number of choices. Some of examples are "from counsel," "to counsel," "prepared by counsel," "from legal staff," "to legal staff," and "prepared at the request of counsel." The fourth component is a relationship phrase, which could be identical. Other similar words with a similar meaning include "regarding," "referring to," "mentioning," and "discussing." A descriptive phrase may be constructed by combining the data values for plural components for the document under review. In a typical data-entry environment, one has to type in data by keystrokes. The present invention shows three methods for performing such tasks. Two of the methods allow members to retrieve the values for each of the components interactively.

In the first method, the server generates a data-entry form, which contains one long input box ("construction box") for phrase construction. Each of a series of keystrokes triggers an embedded script to call a server search program to retrieve possible data choices for the associated component and display the choices in a selection box. The keystrokes attempted for the first component causes the server to find the data choices from M choices, the keystrokes attempted for the second component causes the server to find the data choices from N choices, the keystrokes attempted for the third component causes the server to find the data choices from 0 choices, and the keystrokes attempted for the fourth component causes the server to find the data choices from N choices. Each time, the member selects a choice and causes it appended to the phrase under formation with a space preceding the choice. When the member finishes the process, a phrase is constructed in the construction box.

To reduce the number of database tables, the data choices for each of the components can be saved as a properly delimited string in one single field in the setup table. Therefore, all data in the above example can be saved in four records. The source data can also be in any of the fields in any of the database tables. To avoid potential confusion from losing track of keystroke sequence, all of the sequential searches may be triggered by unique keystrokes such as 1, 2, 3, and 4 while the space bar may be designated for sequential keystrokes in the simplest implementation.

The page containing construction tool has a script for calling a server search function in Java or JSP page. When the member types in the first keystroke or a unique key, the script calls the search function with parameters for defining the data source for the first component. The search program, in response to each key keystroke, returns all responsive data choices found in the data source and shows them in the selection box for the user to select. The member selects one of the choices. The member then types in a second key or unique key for the second component, and causes the script to call the search program to get all responsive data choices for the second component, and displays them in the selection box. The member again selects a choice, and causes the selected choice appended to the first phrase with a preceding space.

The keystrokes for defining component order are different from the keystrokes for retrieving data. The keystrokes for defining component order may be the control key while all normal keystrokes can be used to narrow down choices interactively. When the number of data choices for a component is large, it is preferable to retrieve only the choices containing typed letters. In this case, the data choices are best saved in a database table.

After a phrase is constructed, the web form is submitted to the server for processing. Upon receiving the web form, the server retrieves the data and saves them, including the constructed phrase, in the database table for the privilege log. The web form may contain plural construction boxes for different destination fields or plural construction boxes for the same destination field which uses different data sources.

In the second method, component data are entered into plural boxes next to a nominal input box and a phrase is constructed on the server when the page is submitted to the server. A typical data-entry form contains several fields, but only one or two fields may require phrase construction. Moreover, the values in some fields (also referred to as "primary fields") may be used in a phrase under construction. Therefore, the construction box for accepting a phrase and all component boxes for accepting component data should be placed in the last rows so that the component boxes are able to use the data from primary boxes that have been filled first. Since the construction box does not accept component data directly, it may be omitted or shown as an inactive box while the component boxes may be shown as active input boxes with distinctive looks (e.g., different colors and shapes). When the member types in a keystroke in the first component box, the server retrieves all responsive data choices for the first component and displays them in the selection box. The member selects a choice for the first component. The member then types a keystroke in the second component box, views the responsive choices repeatedly, and selects a choice for the second component. The member repeats this process until all of the component boxes are filled. After the member finishes the form, the page is submitted to the server for processing. Upon receiving the submitted data, the server gets data for each of component boxes, constructs a phrase, and saves the constructed phrase in the intended field of the record associated with the document under review. In the alternative, the phrase may be constructed on the web page by embedded script in real time and saved by a server program upon submission.

Additional feature for previewing constructed phrases may be added. A preview button allows the member to view constructed phrases by showing the constructed phrase in the construction box without deleting the data in individual component input boxes.

A data-entry form may contain both input boxes for primary fields such as attorney name box, document date, and a construction box together with plural component boxes. If one of the individual component boxes shares the data with one of the primary boxes, script may be placed on the page to copy the data from the primary box to the component box automatically. This script can be generated automatically upon opening the data entry page, which is set up with construction tools.

The above construction method may work with the identity data search method. The investigative identity data search algorithm is able to return identity data ("names") with the counsel names marked with "* Esq". FIG. 40 shows the result of processing identity data in Group A and Group B. While group A source data fall outside the drawing, it is actually same as the data in FIG. 38. All attorney names such as John Smith in the group A and G. M. Homes etc. in the group B have been marked with "*Esq". A list of the names in an email may have a counsel name. The counsel name may be entered in the description field for the document under review. The description may look like "[An analysis] {from counsel,} {John Smith*} {concerning} [company business]" where the third component "John Smith*" is any counsel name. It could be done by first manually identifying the counsel name and then copying the name into the right component box or construction box to incorporate the name in the description. The same task can be done by first searching the list of names against the name table to identify the counsel. From the name search result, the member knows which is the counsel name and the exact spellings. The member can copy the name into the component box manually to construct the description or by typing a right letter such as "s" in the third component box to get all last names and associated first names. The keystrokes in the third construction box or third keystrokes in a single construction box triggers the browser to call the search program to retrieve attorney names in response to typed letters. The arrangement of putting the search box on the data entry form not only eliminates the time for conducting manual search, but also reduces time for typing attorney names into the privilege log.

The investigative identity data search algorithm can be further incorporated in the construction feature. On the data entry page, a large input box is added for accepting source data for optional use. If the member knows who is counsel on the names list, this search box may be ignored and the member can directly type in the letter to retrieve counsel names in the component box. If the member is unable to identify counsel names from the long names list in the source data, the member can copy the names list as source data into the large input box to conduct a search. The result is returned and printed in an output box on the same page. Now, the member knows the attorney names. In the search process, the server retrieves all data from all primary boxes including names, find the names in the name table, creates a return page identical to the previous page, fills the data in respective boxes, and sends the page containing the search result with attorney names marked to the browser. Now, the member knows who are counsel, and copies all counsel names into the right component box, or retrieve counsel names interactively for the component box by typing right letters, or retrieve the names by typing right letters in right sequential order in a single construction box. This process not only eliminates manual name search, but also speed up data entry speed.

The phrase construction box for the description field should be placed in the last place on the construction form so that the member has all required data in the primary fields. In this case, the value for the third component may be copied from the primary input box for the attorney name field. This can be done by script that is triggered by the first keystroke in the third component input box or the third series of keystrokes in the construction box.

The third method of phrase construction is a server tool that allows for construction of a short phrase using the values from other related database fields. All of the data in the fields must have unique values. In this case, phrase construction can be performed after all of the required fields have been filled with unique values. The program must mark out all records that have missing component data. In addition, all resulted phrases should be verified in a quality control stage to ensure that errors from component incompatibility are fixed.

The multiple component construction method can be set up for the data-entry page while the single input box construction method can be set up for the Edit Table page. On the Edit Table page, the member can cause the browser to generate a row of input boxes for a data record by clicking the Enter Record button. Plural data entry rows may be created to accommodate plural data records.

If the data entry function is implemented on a review platform, the system needs to use document ID so that the resultant phrase can be written into the description field of the record which is associated with the document. Synchronization between the document ID and the record ID in the privilege log can be achieved by exporting document ID from the review platform and importing it into this system. If the system cannot import document ID from the review platform, the document ID must be typed in the system manually.

7. Data Access Control

Data access right is determined by data access rule. The setting of private access for a database table allows a member to edit and delete only the member's own tentative records in the tentative or combined table while the setting of public edit allows the member to edit and delete any tentative records in the tentative and combined table. However, data access rule in one version of embodiment does not prevent tentative records of other members from showing up in the validation table.

The access rule for editing data records is determined by the project manager on the Setup page. Unlike the tentative table, the Edit Table in one version of embodiment shows only authorized tentative records. If Edit Table is setup with the setting of public-edit, any of the members can view and change any of the records in the table. If Edit Table is set up with the setting of private edit, the member can view and edit his own tentative records.

In another version of the embodiment, the display scope and access rule are used to jointly control data access in Edit Table. Display scope has three values: display all records, display all tentative records, and display only member's tentative records. Data access rule determines if a tentative data record can be edited and deleted by another member while the display scope value determines what kinds of data records appear in Edit Table. The tentative records that the member is not authorized to edit are shown as inactive records, but the member can view and copy them, and paste them onto new records for further edit. However, the member cannot paste any record over a non-editable record.

While data access rule determines the potential records that could be editable, search function and page number navigation controller can further reduce the number of data records displayed on Edit Table.

8. Internal Email System

The member can use the internal email system on the server to exchange email between the member and other members including the project managers. The links for invoking the email function are at the right top. The member can view received messages by clicking the Received Messages link, and view sent messages by clicking the Sent Messages link. The member can also view detailed email message by clicking its subject line. An opened message has a subject line, sender's information, message body, and links for attachments. It also has a Delete button. The member may send message to project managers and other members. The member may send messages to the server administrator but cannot communicate with any of the members of other projects hosted on the same server. The page for sending email is identical to the page for the manager to send email. The member is allowed to include an attachment by using the similar method used on the manager's email page. The member can delete messages from the sent messages table and the received messages pages.

This system also provides a page containing comprehensive instructions and project administration tools. On this page, a member can view procedural guidelines, substantive guidelines, time sheet, and payment histories (FIG. 43).

E. Personal Server Pad

A server pad ("Personal Pad") is a server-driven notepad-like tool for storing casual information in casual format, but has a powerful capability of managing discovery information. The concept was originally described in a parent application for Discovery Information Management System. The server pad has a large display box for writing data, a submission button for saving and updating the data, tools for sorting saved data on the server, a query box for conducting conventional searches, and an input box for interactively retrieving saved data. Its data is subject to global search.

The same concept can be realized by using the Edit Table function with the following changes: (1) the member or manager is allowed to define the number of fields for containing date and message body so that the pad looks like a desktop calendar; (2) the database table is a personal table that is not subject to searches by other users; (3) its database table is subject to global search by the owner user so that the user can use one key to find information from all shared database tables and personal pad's database table; (4) the pad is also implemented with an interactive search tool for one or more fields; (5) all of the functions such as search records, adding records, deleting records used in Edit Table remains. The pad table may have three default columns date, order, message body, plus other columns for tracking records such as deletion status. This implementation can be perfected by using the feature of multiple line display layout and setup function so that it will have a large text body. In the setup for personal pad page, links are provided to configure database tables, related properties, and font size, which should be persistent.

Investigative Identity Data Search Algorithm can be modified to search member's server pad. The personal pad is expected to contain informal names, short names, email, notations, and abbreviations in the main text body. The match methods, which are originally used for the name search function, can be used to search data pieces on the pad's database table. Also, personal pad and Investigative Identity Data Search web module can be used side by side. For example, a name may be found from the name table and additional information may be found from the personal pad records.

For a system hosting one or more discovery projects, the number of the members is unknown. For this reason, the database table for a member's personal pad cannot be created before the member has a user account. A dedicated database table or required entries in a shared table can be created when the account is assigned or when a member logs into the system the first time. After the member provides some basic contact information, the server saves account information, and makes a call to the program for creating the database table for the personal pad.

F. Investigative Identity Data Search Algorithm ("IIDS")

In many investigative cases, information about personal identity data is incomplete and inaccurate. When an investigation involves a large number of people and a large number of documents, it is often necessary to build database by using whatever information is available. Likewise, the source names such as recipient names in email or other documents are often incomplete, inaccurate or misleading. In a typical database and in documents, people names may be given as email addresses, initials, first names, last names only, capital strings, and even notations. Likewise, a variety of company names may be written as abbreviations. The algorithm and web module disclosed herein allow the user to find all records which would be matches, or records relating to an identity datum, but not records that can be excluded. Thus, whenever an identity datum is incomplete or in error, the program must be able to find all records that may be correspondent to the identity datum.

The algorithm and web modules may be installed on any system with two or more levels management accounts. It can be installed in a system with only one-level project management or a system with one fixed project. FIGS. 32-37 show one version of Investigative Identity Data Search Algorithm and web module.

1. User Interface for Conducting Name Searches

When the algorithm is implemented as an Internet web module, the server first generates a user-interface page shown in FIG. 32. This page contains an input box 800 for accepting name list, which is referred to as source data or data source. At the top of the page, a link "Normal View" is for returning to the home page. Below the input box are two mutually exclusive radio buttons 801: Default Search and Current Search. The user can click Default Search to use the default setup to conduct a search or click Current Search Setup to conduct a search using the current setup. Different search methods may be referred to as "search mode."

The page for "Default Search Setup" is shown in FIG. 33. The page for Current Search Setup is identical to this page except that it has no "Save" button and "Revert to Common Mode" button. One difference is that the user can set up or modify the default setup page and save the settings in a database table or file. Thus, the settings are persistent until they are changed. In contrast, the current search setup is not saved, and it is persistent in a session. After the user logs out the server and logs in again, all current settings are gone. Current settings in default values are generated by the server. It is convenient for the user to change any setting and submit a search.

2. A Name Search Example

After the user selects match methods and other settings, the user copies source data containing people's names and email addresses into the large input box, and submits the page to the server to search the source data in the name table containing about 1200 records. The server returns the result shown in FIG. 34. The result page in FIG. 34 shows the source 803 and the found identity data 804.

The program gets all identity data such as names and email addresses as complex search keys. The server then finds John Smith for Fleming because John Smith's initials is mentioned in the comment; it finds Dean Smith for Dean Smith because both names match precisely; it finds Jack Farrell for David Franklin because Jack Farrell's boss would be David Franklin; it finds Charlotte Anderson for ABC because ABC would be her initials, it finds Kristina Vinson because she is partner of the ABC firm; it finds Laura Bumpus for the key X.Y.Z. because Laura Bumpus is married to X.Y.Z., and it finds Xerron Zedon because X.Y.Z could be Xerron Zedon's initials. This search gets useful information which otherwise could require tens to hundreds of individual searches.

The program also allows the user to click the link "Show Names not Matched" (on top of the result page) to see a list of identity data that are not found in the name table (FIG. 35). It has a function for selecting identity data and adding them to the name table.

3. Set Up the Name Searches

By using the Setup page shown in FIG. 33, the user can select delimiter for separating the identity data from three choices: comma, semicolon and carriage return. The program also allows the user to select mark words such as "from", "to", "sent" and "beginning of message" as the start marks for defining search key ranges (also known as "segments" or "key segments"). The program allows the user to keep track of identity data from different segments, accepts plural line breaks as the separator between any two segments. The end mark for any of the defined segments may be a start mark for the next segment, a defined end mark, or plural line breaks. Ignored words are words that are inside the search ranges or segments but should not be used as search keys. An ignored range is a range of text that is within a defined segment that should be removed. An ignored range is defined by a unique start mark and a unique end mark. The start and end marks for defining ignored ranges must be different from the marks for defining search ranges or segments. The user can create two boxes for accepting a start mark and an end mark by clicking the Add a Range link once and removing a pair of input boxes by clicking the Remove a Range link in FIGS. 33, 39. The start marks and end marks should be unique relative to the source data. They cannot be part of common names, person's initials, and email address. If a person's name is "from", this name must be handled specially. A page can be submitted for search with search ranges, ignored words, and ignored ranges undefined.

The user then sets up match or search methods, which are suitable for the name data and the structures and content of the database table. A successful algorithm must have the flexibility to select different match methods. In a typical investigative discovery, unknown name, notation, initials and relationships with other persons and firms are often put in a comment or note field. A short name and notation may be put in a name table as first name or last name by mistake or according to a default database construction rule. Match methods include basic match methods and optional match methods. Some match methods include the following: (1) full name match, email address match, and acronym match, (2) first initial-and-last name match, (3) obvious initials and first letters of names match ("J.S." with "Jack M. Smith"), (4) obvious initials and comment match, (5) multi-part names and comment match, (6) small initials (e.g., "job") and comments match, and small initials and first letter of names match, (7) single word and first name match ("John" with "John Stone"), (8) single word and last name match ("Stone" with "John M. Stone"), (9) single word and firm name match, (10) last name match only ("John Black" with "John Stone"), and (11) first name match only.

The user selects the option for "Show Type" and "Ordered By" drop-down boxes. Available choices include law firm, client, partner, and other parties. The names found by the program can be ordered in three sorting keys: personal name, firm name, and email, as shown in the setup page (FIG. 33) and reflected in the search result page (FIG. 34).

4. Name Data Preliminary Treatments

After the user opens the name search page at Step 810, and submits the name search page to the server at Step 811, the server processes name source data according to the steps below.

Step 1, Remove Garbage in the Source Data

Source data include many name data and other junk. Some of the source data may contain garbage such as special characters, control characters, and other characters that are not used in ordinary documents. The garbage may interfere with the search function and, therefore, are removed at Step 812. Garbage characters may be replaced by nothing or spaces if the spaces are not used as segment separators in the source data. This results in plural spaces in some places, which can be eliminated by repeating operations of replacing two spaces by one space. An alternative method, which is more efficient, is to go through the entire source data string, evaluate characters, and copies only those good pieces to a new name-data string while skipping bad characters.

Step 2, Recognize Special and Single Name

Since many searches may be done for one person's names containing two or four words, the server determines if the source data contain only 2 to 4 words or a single name datum (Step 813). If it has only one name datum for one person, the server directly uses it for search without going through range analysis. If it finds more than one name data, the program must break up the source data into segments and further into individual names.

Common names can be represented in the following examples: John M. Smith <jms@test.com>; "John M. Smith"<jms@test.com>; "john.smith@test.com"; John M. Smith, Jr.; John Smith; Smith, John M.; Smith, Jr., John M.; Smith-Park, John M.; J.S.M; John; ABCD; John and Smith; Black & White. Many of those examples may have spelling variants. Initials may contain two letters, and acronym may have various letters. The program removes comma, semicolon, and space at the beginning and end, and counts total words, "and," "&," ",", ";" space, and special suffixes such as "Jr." "Sr." "I." "II." "III." The rule for finding a single name datum is stated as follows:

(1) A name datum that contains an unbroken email address, the name component has no more than 2 spaces.

(2). A name datum that contains two or three words (John J. Smith) without comma, semicolon, "and" and "&".

(3) A name datum that is not an email address and is of reasonable length without any space within ("ABCPLL").

(4) A name datum that contains "and" or "&" and have 3 meaningful words may be treated specially or rejected as an error.

(5) A name datum that contains "and" or "&" and have more than 4 words may be treated specially or rejected as error.

The algorithm for recognizing single name does not have to be perfect. If the program is unable to handle a name datum, the user can change its format before submission. Item (c) can be further divided into several sub-types. In recognizing short names, the program should ignore special strings such as Jr.

Sr. I. II. and does not count them as words. When those symbols are present, they are treated as part of the last name. "Smith, Jr." is treated as last name. In addition, the comma before the name designation is not counted. The program has to treat them specially and should not break up name data at the comma positions. Since those designations appear infrequently in discovery projects, all treatments for this matter are merely a preference, but not a requirement. If functions for handling exceptions are not implemented, the program returns error messages or return incorrect results for those name data. It will not affect other searches.

The program has code for handling the special case where a segment contains only two or three words with a comma without knowing the writing convention. "Smith, John M." could be treated as two persons delimited by comma. One option is to explore all possible cases. Since the program does not use name dictionary, it is unable to know whether a word is a last name or family name. Also, many foreign names can be used as both first name and last name. The comma may be the separator between two persons. In this case, the program can conduct three searches (1) "Smith" as first or last name, (2) "John M." as first and middle name, or as first name and last name, or last name and middle name (3) "John M. Smith" as first name, middle name and last name. In case (1), the program uses "Smith" as a last name to conduct a search and uses it as a first name to conduct a search. In case (2), the program uses "John" as first name and "M" as a last initial to conduct a search, uses "John" as last name and "M" as a first initial to conduct a search, uses "John" as a first name and "M" as a middle initial to conduct a search. In case (3), the program conducts another search by using "John" as first name and "Smith" as last name to conduct a search. While those permutations are not necessary for this particular example, they could help the user resolve inadvertent name arrangements or a confusing name datum such as "Sunmt, Jqpt Zogt" which could be two persons. Even an intelligent human cannot tell whether "Sunmt, Jqpt Zogt" means one person or two persons. All of those exploratory match methods may be implemented as switchable functions. Those match methods may be adjusted if the user can see its writing convention from the names in their context. Each of the name data may be one of the following four forms: (1) two or three names, (2) one single word, which may be a last name, first name, notation, number, and acronym, (3) email address, and (4) obvious initials such as "A.B.C.", "a.b.c." and "X.Y." Name data may also mean company names, law firm names, and other business names.

Another exploratory match method arises from the treatment of phrases containing "&" and "and". These two words are often used as a conjunctive word between two persons, and such structure is often used in law firm names and other entity names. For example, "Black and Stone" may mean two persons or one business entity. One method for treating this type structure is to pass it to the program for further processing. In this case, the program should add a step of recognizing the structure. "Black Green & Stone" means three persons or one business entity, but "Black Green and Blue Stone" most likely means two persons or two business entities, but cannot mean one business entity. "Black Green Blue and Stone" may mean four people or one business entity. The switchable functions are implemented to recognize those common structures.

Step 3. Obtaining Plural Search Ranges or Segments

Name data may have plural segments, each being corresponding to a search range or "segment". The program finds all ranges by looking for unique marks in the source data and gets each of the ranges or segments for further processing (Steps 814, 815). This operation is used only if the source data has sufficient length. This operation is especially useful when source data are copied from email address header. Email address header normally contains certain words like "from:" "to:" and "sent." One reason for breaking up source data into segments is that it is desirable to use them to track sender, recipients and cc-recipients in the search result. Those words can be conveniently used as marks for identifying segments and the marks for tracking names.

Start marks and end marks may be paired or unpaired. When a start mark and an end mark are paired, a range is defined by the start mark and the end mark that is associated with the start mark. Paired end marks may be useful only in certain cases where end marks are unique.

The program extracts segments that are defined by a start mark and the closest next start mark, a start mark and the closest end mark, or a start mark and plural closest lines breaks. In implementation, the program searches through the source data, which is a long string, for each start mark. When the program finds a start mark, it then searches for one of the end marks. If it finds an end, it finds a segment or range. If the start mark has a paired end mark, the program searches for the paired end mark at the second nearest position. After the range is copied, the program then moves the search position to the end mark, and repeats the process of searching for start marks and end marks, and finds the second range and copies it. The program then jumps the search position again and repeats the process until the program reaches the end of the source data.

The program may be implemented by one single trip: the program searches for all start marks until it finds one, saves the position as X, and starts searching from X until it finds a closest end mark or a paired end mark at position Y. The program copies the first range from X to Y for later use. The program assigns Y to X, starts searching from X until it finds a closest end mark or paired end mark at new Y, and copies the range as second range. For source data from email, end marks are normally next start marks. Thus, the program just uses the first end mark as the start mark for the second range without conducting a search. In this case, use of end marks is not necessary.

Step 4. Removal of Ignored Words and Ranges from Each Segment

The program has this optional feature to remove ignored words and ignored ranges from each of the segments (Step 815). If the user has provided ignored words, the program searches and find them, and remove them. This can be achieved by replacing an ignored word by nothing. Each of the ignored words can be eliminated by the same method. If the user has defined start marks and end marks for ignored ranges, the program identifies the ignored ranges by finding the start marks and end marks for the ignored ranges. If the program finds an ignored range, it removes it, for example, by replacing the range with nothing or by copying the prior segment, skipping the ignored range, and copying the next range. One version of pseudo code may be as follows:

(1) Start search for start marks for ignored ranges at position S=0, where S is absolute index position in the segment;

(2) Find a first start mark at X (the start position) and the closest end mark or paired end mark for an ignored range at Y (the end position) where X and Y are relative to S position;

(3) Copy the first sub-segment (from S to S+X−1) and paste the value to product string P[ ];

(4) Move search position to Y or do assignment S=S+Y; and (5) Start a search at S for start marks for ignored ranges, find a start mark at (new) X and the closest end mark or paired end mark at (new) Y, copy the first sub-segment defined by (S to S+X−1) and append it to P[ ], skip the sub-segment by assigning the search point S=S+Y, and repeat the process at step 5.

By using this scheme or any of the known algorithms, the program can remove all ignored ranges from each of the segments efficiently. This step may be performed after the step of cleaning up garbage and the step of identifying single name datum. If the program finds that the source data contain name datum only for one person, the program bypasses both the step of finding segments and the step of removing ignored words and ranges. If the program cannot find start marks and end marks for ignored ranges, and ignored words, the program skips these operations.

Step 5, Break Up Each Segment into Plural Names

If a segment contains more then three words (more than two spaces) without counting the special designation word, the program breaks up the segment into individual names. In addition, the program may handle certain short segments in a special way.

The program first determines if the user has provided a delimiter at Step 816. If a user-provided delimiter is found at Step 816, the program uses it to break up the segment at Step 822 and gets one or more names at Step 824, which is for further processing at Step 825. If the user did not provide any delimiter, the program tries to find comma and semicolon at Step 818. If the program finds comma only, it breaks up the segment by comma at Step 823, and gets one or more names at Step 824. If the program finds both comma and semicolon at Step 821, it uses semicolon to break up the segment at Step 826, and gets one or more names at Step 824. Other logic operations have been used successfully. At the end, the program obtains plural names for one plural persons or entities, and store each of the name data in designated variables. When both comma and semicolon exist, comma is treated as a separator between a last-name and a first name. Any abnormal values in any of the name data may be reported as error. The user may choose not to provide a delimiter. A rule may be in place that name data containing two or three words should not broken up by comma. Their plurality nature may be handled in a later names-recognition stage. Possible plural identities can also be taken care of by matching each of the names with first names and last names, respectively.

Step 6, Recognizing Name Datum Components

Figure 37:
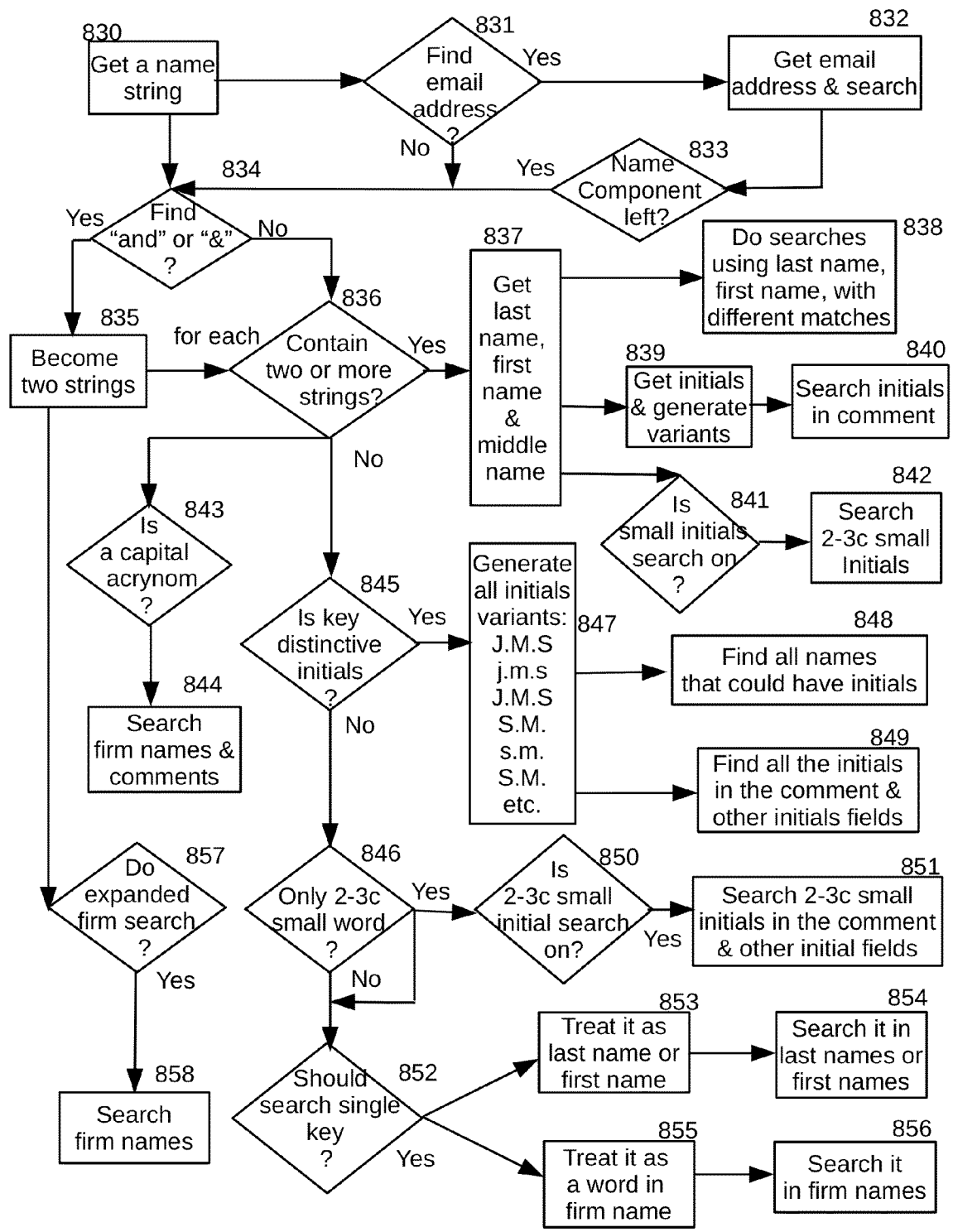
FIG. 37 is a flowchart showing the process for conducting an investigative identity data search.

As shown in FIG. 37, the program in the name recognition step breaks up each of the name data into four fields: email, last name, middle name and last name, and store them in designated variables in Step 830. If no value is available for any component, the designated variable is empty. The identity components may be stored in string vector such as Java string first_name[ ], last_name[ ], middle[ ], and email[ ]. The component data defined by an identical index number are for the same person or entity. Two-dimensional string may be used to track segment origins such as "from" and "to." To track segment origins, data structure like union in C and C++ in C implementation may also be used to store the data so the index numbers are related to segments and order numbers.

After the program gets a name datum at Step 830, it determines if it has email address at Step 831. If the name datum has a good email address, the program gets the email address. The program recognizes email address like XYZ@STRING.ABC.NC, where XYZ is a continuing string without any space, ABC may be com, net, pro, edu, org, and NC is optional two letters. The program may just recognize a structure like "@anything.XXX" and get the complete email address by getting the entire string. If the program gets an email address, it saves it in a designated string variable and uses it to search in the email address field in the name table. If an independent email address field is not declared, the search may be made against the comment field. If no email address is found, the name datum is directly passed to Step 834. The program then searches for "and" and "&" at Step 834. It is preferred even if a search for "and" and "&" has been performed for the source data containing single name data. The reason is that some short name data would have a structure like "Green and Black."

The name components in the name datum are recognized by word count and the presence and relative location of the comma within the name datum. In counting words, the program ignores special suffixes like Jr. Sr. I. and III. The general rules for recognizing multi-part names are:

(1). If a name datum has two words without a comma, the first word is taken as the first name and the last word is taken as the last name. An example is "John Smith".

(2). If a name datum has two words with a comma, the program checks the location of the comma. If a comma is at the far left or far right, the program ignores it, if the comma locates between the two words, the first word is taken as the last name and the second word is taken as the first name. Some examples are "Smith, John" and "Smith-Park, John" and ",Smith, John," where the first comma and the last comma are ignored.

(3). If a name datum has three words without comma, the program copies the first word as the first name, the second word or initial as the middle name, and the last word as the last name. An example is "John Mac Smith".

(4). If the name datum has three words with a comma and if the comma locates between the first word and the second word, the first word is taken as the last name, the second word as the first name, and the last word as the middle name. Examples are "Smith, John M." and "Smith-Park, John M." The program is able to recognize suffixes such as Jr. Sr. I. II. and III., and does not count them in the total word number. The program correctly recognizes "Smith, II, John M." and "Smith-Park, Jr., John M."

In breaking up name data, the program assumes that all of the name data are generally written in the same format by the same author. If a last name is written in front of a name datum, all last names are placed in front. Plural functions may be developed, each for recognizing one of the common patterns discussed above. The functions are respectively for recognizing common patterns. When a function recognizes a multi-part name pattern successfully, it gets all components and returns a success return code. The program tries to recognize and breaks up the first name datum from a segment until a success code is returned. Then, the program recognizes and breaks up the remaining name data from the same segment. The program may have various recognition functions and try to use other functions only if it is unable to break up a name datum.

The recognition function may be implemented as a single function for recognizing all common patterns. The logic for implementing this unified function is as follows. The program first counts the words excluding suffixes and special words. The function has three conditional statements: count=2, count=3 and count=4. Each short name must fall within one of the conditions. For count=2, the program determines the existence and the location of comma (with the ending comma ignored). By looking at comma location, the program determines which name patterns the name datum belongs to. The program does similar analysis for three-word name datum (count=3) and four-word name data (court=4). An error code is returned if a name datum has more than 4 words. Name data containing more than four words is treated manually since they are rare. After the breakup of a segment, it is still possible to run into certain unique structure such as "John Smith, xyz." The presence of this structure may be due to an error in using delimiter. The program regards the first two words as a complete name and the third word as a partial name for another person. This third word would be a first name, a last number or an abbreviation. As discussed above, this kind of structure may also be identified before the recognition step. After a segment is broken up, each of the resulting plural name data is stored in a suitable string variable or vector. In the alternative, the recognition step may be performed immediately after a name datum is returned from the breakup step. The program has to store components data in designated variables.

5. Name Match Methods

Most of the match methods are shown from Steps 836 to 856 and all downstream steps in FIG. 37. The name match methods are shown in the following summary:

| Cases | Name Data | (B/S) | Matched Names in Name Table |
|---|---|---|---|
| 1 | Email address | B | (1) email address in the email field |
|   |   | B | (2) fall-back search in comments |
| 2 | Smith, John M | B | (1) full names in the name fields |
|   |   | B | (2) names in comments (V) |
|   |   | S | (3) initials in comments (V) |
|   |   | S | (4) first name only |
|   |   | S | (5) last name only |
| 3 | Smith, J. | B | (1) last name plus initial |
|   |   | B | (2) names in comments (V) |
|   |   | S | (3) initials in comments (V) |
|   |   | S | (4) last name only |
|   |   | S | (5) first name only (Excessive hits) |
| 4 | S.M.J.; SMJ (s.m.j.) | B | (1) first letters in names (V) |
|   |   | S | (2) initials in comments (V) |
|   |   | S | (3) initials in firm names (V) |
|   |   | A | (4) "Smith, Marc & Jones, LLP" (V entities) |
| 5 | S.J.; SJ; s.j. | B | (1) first letters in names (V) |
|   |   | S | (2) initials in comments (V) |
|   |   | S | (3) initials in firm names (V) |
|   |   | A | (4) "Smith & Jones LLP" (V entities) |
| 6 | jo or jon (Small case) | S | (1) "jo" or "jon" in first names |
|   |   | S | (2) "jo" or "jon" in comments |
|   |   | S | (3) "John O. North" (V) |
|   |   | A | (4) "Jones, Oblin & North, LLP" (V entities) |
| 7 | Smith | S | (1) "Smith" in first names |
|   |   | S | (2) "Smith" in last names |
|   |   | S | (3) "Smith" in firm names |
|   |   | S | (4) "Smith" in comments |
| 8 | Smith LLP | B | (1) "Smith PC" (V entities) |
|   |   | S | (2) "Smith and Stars, PC" (Extended) |
| 9 | ABCD; A.B.C.D. (Distinctive; >3) | B | (1)"ABCD", "A.B.C.D." in firm names |
|   |   | B | (2) "a.b.c.d."; "A.B.C.D." in comments |
|   |   | A | (3) "Allen, Brow, Calvert, & Doles" (V) |
| 10 | Smith and Stone (Smith & Stone) | S | (1) "Smith and Stone" (V entities) |
|   |   | S | (2) "Smith and Stone, PC" (V entities) |
|   |   | S | (3) "Smith & Black, LLP" (V entities) |
|   |   | S | (4) As two name data: Smith; Stone |
| 11 | Smith J and Car | N | As two name data: Smith J; Car |
| 12 | Smith and x.y.x | N | As two name data: Smith; x.y.z. |
| 13 | Smith, Bo & Tu | N | (1) as three name data |
|   |   |   | (2) "Smith, Bo & Tu LLP" (V entities) |

"B" means basic match methods that are used in the default search method, "S" means switchable functions; and "V" means the matches include common variants that can be generated from the name datum. Some entity variants arise from entity designations such as LLP, LLC, INC, CORP, CO, and PC. "A" means a switchable method for searching firm name initials.

The name table contains fields holding first name, last name field, optional middle name, type, and comment. The email address field in the name table is optional, and may be put in the comment field. Middle names in the name data are shown in the search result so that the user can tell whether middle names match. Middle names could be treated as part of the first names as long as the middle names are treated as an attachment to the first names or treated as a separate field. If middle name is used as a match criterion, it is preferable to have a middle name field in the name table. A difference in two middle names could be conclusive evidence to distinguish two name data. A setting for turning on and off middle name match may be added to the setup page. The match methods include the following:

Case 1: If email address in the name data is same as the email address in any field in the name table, it is a match. Their letter cases do not affect their match.

Case 2: The basic match rule is that when a last name and a first name from a name datum match with the last name and the first name in the record of the name table, a perfect match is found. The name datum "John E. Smith" is matched with "John E. Smith;" "John Ellen Smith;" "John Smith" in both name fields and the comment field.

The comment field plays an important role in defining the relationships between different people. For example, a comment may include a note like "X.Y.Z. is a contact person for John Smith." Personal names may be referenced in comments (e.g., "Jack Stone once represented him in his criminal case"). The name table may contain incomplete names, partial initials, and wrong names. "John M. Smith" matches "J.M.S." and its variants in the comment. The program assumes from the position that Smith is a last name, and thus the possible variants in the comment include J.M.S., j.m.s., S.M.J., s.m.j., J.M., j.m., M.J., and m.j. It also matches JMS, jms, SMJ, smj, JM, jm, MJ, and mj (all are switchable matches).

Middle name is ignored if either side does not have it. However, middle name may be used to exclude a match. Thus, the program would not retrieve "Smith, John Z." for "John Ed Smith." When a name record in the name table contains only a first initial rather than a full first name, a match is found if the first initial in the record is the same as the first letter of the first name in the name datum. When a name record has a missing first name or last name, the program has the option to not retrieve the record or treat the missing part as a match. This liberal matching method will not give rise too many false hits because a majority of name fields have values in the name table.

Case 3: The name datum contains last name plus first initial. "Smith, J" matches "J. Smith," "J. Marc Smith," and "Jack Smith" in the name fields and comment fields. The program matches the last name with the last name field and the first initial with the first name field. The first name is considered as a match if the first initial J. is same as the first letter of the first name. Middle name is ignored if either side does not have it. "Smith, J" matches J.S., j.s., S.J., s.j. And matches JS, js, SJ, and sj. Since people use initials without following strict rules, more variants may be considered. This method covers only what is known as obvious initials.

Case 4: If a name datum is obvious initials, the program matches the initials with the first letter of the names. Since initials in documents may be written in different forms knowingly or by mistake, the program generates all possible variants to match with the first letters of both first name and last name. Thus, J.M.S or j.m.s or JMS matches "Jon M. Smith" "Jackson, Mark. S." "J. Smith" "Jackson, S." "J. M. Smith" and "Jackson, M. S" in both name fields or comment fields. It also matches all initial variants in the comments, and firm names whose abbreviations are same or similar.

Case 5: For two letter initials, J.S., j.s. or JS matches "J. Smith" "Jean Sun" and "Jackson, S." in name fields and comments, and AB, A.B. and a.b. are matched with firm names: "AB", "A.B.," "a.b." and Alon Brown LLP. When dots are present, searches may be conducted without regarding letter cases.

Case 6: Two or three letter small initials ("small initials" or "2-3c small initials"). Those initials contain two to three small letters without period. Small initials such as "jo" and "jon" may also be a first name. It matches first name "Jo" or "Jon" in the first names and comments. It may also match "John O. North" in the name fields or "Jones Oblin and North LLP." If a name datum is initials, the program searches for the initials and all possible variants in the comments. Two letter small initials such as "go" may match "go" in first names, and "go" and its variants in comments, "Gina Oliver" and "Goldman Oliver, PC." Two letters between the first initial and the last initial may be transposed. Therefore, match methods should include all possible initial variants. The program has the option to generate all initial variants and uses them as search keys to search the comment and first name fields.

It is difficult to tell whether small initials is a single name, a word, name initials or firm name abbreviation. If the first letter of a name datum is of a capital case (e.g., Ed or Jon), the name datum is probably a first name. Some small initials such as "the" "sch" "ing" and "on" appear in comments in very high frequency. A search using small initials and variants may get a large number of false hits, and therefore this match method for searching comments is implemented as switchable search. When this feature is turned off, the program will not search the comments. Since this word is also a single word, it may still search a first name or as last name, depending upon whether these two search methods are on. An alternative measure may be taken to avoid overly inclusive searches and reduce the number of false hits. The program may check the name datum against a dictionary containing all common names such as "ed", "jon" or "dan" "tim" and "sam." If it is found to be a common name, it is treated as first name and initials as well. If it is not found in the dictionary, it is treated as initials only.

Case 7: If the name datum is a single word, its potential meaning cannot be determined by checking it in a dictionary because many words can be used as both last names and first names. Since the program is intended to find as many persons and firms as possible, it treats a single name as both a first name and a last name. Thus, "Smith" matches "John Ed. Smith" "Jackson, Smith," and "John" matches "John Mark Stone" and "John, Lisa" (obviously an incomplete entry). One word may also match value in comment or firm name such as Smith, PC.

The single word could also include small initials because the program cannot distinguish one from the other, but can definitely exclude obvious initials such as "a.b.c." and all-capital acronyms such as ABC. The program first treats single word as a first name, searches first names, and retrieves all matched records. It then treats the word as a last name to find all last names. It is preferable to implement this match method as a switchable method.

A last-name-only match method may be applied to name data that have multi-part names. For example, "John Smith" matches "Smith." The reason for conducting this match is that the database may be incomplete or inaccurate. This search is particularly useful when there is a reason to believe that the first name in the name datum or in the name table is incorrect. Search results may give the user a clue for further investigation.

Case 8. It is often necessary to find law firm names and company names. "Smith LLP" matches "Smith LLP" "Smith and Stone LLP" "Smith & Stone PC."

Case 9. Obvious acronyms are a data string containing at least two capital letters or separated by dots. Acronyms that have two to three capital letters may be obvious initials. Examples are "AB," "ABC," "ab," and "abc." Those acronyms could be persons' initials and should be treated as initials as well. If an acronym has more than three letters and in capital case or separated by dots, it is a distinctive acronym. distinctive acronyms are matched with firm names or comments only. Their match reliability increases with the number of letters. For example, ABCD and a.b.c.d. are matched with "ABCD" or "a.b.c.d" in comments, "Alon, Brown, Cart & Dole, LLP," "ABCD" and "a.b.c.d." in firm names. ABC, A.B.C. and a.b.c. match with "ABC," "A.B.C.," "a.b.c," and Alon, Brown and Cart, LLP in firm names and comments.

Case 10: When two words are connected by "and" and "&", the name datum means two persons or a firm name. "Smith & Stone" or "Smith and Stone" matches "Smith & Stone LLP," "Smith and Stone PC" and "Smith & Stone." While the program uses entity designation such as LLP as a signal for invoking this match method, the program may ignore entity designation differences such as PC, LLC, INC, and CORP. A search for Smith LLP may also find Smith PC. The "&" sign may also be used as a signal for invoking firm name search because it is often used in company names. The name datum like "Smith and Stone" may mean two persons and uses each word of the word to do a search in both first name field and the last name field. "Smith and Stone" or "Smith & Stone" may match any company name such as "Smith and White LLP," "Black and Stone LLC," "Smith and White PC," and "Black and Stone LLP." To reduce false hits, those match methods are implemented as switchable searches. A single word such as "Smith" may match a firm name "Smith, Green & Stone LLP." A search result may provide a clue.

Case 11: "Smith J and Cars" is treated as "Smith J" and "Cars". It may also treated as a firm name if the second word has at least two letters.

Case 12: "Smith and x.y.z." is treated as "Smith" and "x.y.z."

Case 13: "Smith, Bo & Tu" is treated as three persons or one business entity.

Among all match methods discussed above, the first three method and the acronym match methods are considered perfect matches. Some match methods are considered as reliable matches, while others are considered as possible matches. Searches using inputted initials ("J.M.S") are different from searches using initials ("J.M.S") derived a name such as "John M. Smith." The inputted initials and variants are matched with the first letters of names. The initials derived from a name such as "John M. Smith" should not be matched with the first letters of names such as "Jack M. Springs."

It is straightforward to identify different types of name data. It is preferable to conduct match analysis for the cases 10 to 13 before the program conducts rest of searches. Not every match method is necessary in application.

6. Name Search Process

The search process after the segment has been broken up is shown in FIG. 37. The program checks if the name data has email address at Step 831. If it finds a good email address, it gets the email address and uses it to conduct a search at the email field at Step 832. It checks whether a name component is left at Step 833. If yes, the name component is forwarded to Step 834 for name data analysis. If it finds no email address at Step 831, it directly forwards the name data to the optional Step 834. At Step 834, it looks for "and" and "&". If it finds "and" or "&" at Step 834, it splits it up into two words at Step 835 and if the expanded firm name search is on at Step 857, conducts an extended firm search at Step 858. If it finds neither "and" nor "&" at Step 834, it then determines if the name data contain two or more words at Step 836. If it determines that the name datum contains only one word at Step 836, it determines if the name datum is obvious or distinctive initials at Step 845. Obvious initials are 2-3 letters with solid periods or capital initials. If the name datum is not obvious initials, it determines if the name datum is 2-3 small initials at Step 846. If the name datum is not 2-3 small initials, the program treats it as a single word. The program determines if the option for search single key is on at Step 852. If the option is on, the program treats the key as a last name to search last names, treats it as a first name to search first names at Step 854, and optionally search it in firm name at Step 856. If the program finds that the name datum contains two to three names at Step 836, it gets first name, middle name, and last names, copies them into designated variables at Step 837, and then conducts a search using first name and last name at Step 838. It extracts initials from the name datum and generates initials variants at Step 839, and searches all initials in the comments at Step 840. If the small initial search is on and the initials is a small initials at Step 841, the program searches small initials in comments at Step 842. If the program finds that the name datum is distinctive initials at Step 845, it generates all possible initials variants at Step 847, searches for the names that could have all the initials at Step 848, and searches all initials in comments or other initials fields at Step 849. If the program finds that the name datum is 2-3 small initials at Step 846 and the small initials search is on at Step 850, it searches the small initials in comments and optional first name field at Step 851. This name datum is then passed to Step 852.

Optionally, it may include a step of recognizing a long acronym that contains more than 3 capital letters. If the program finds it, it searches the acronym in firm names and comments. The steps of recognizing name data at Steps 836, 845, and 846 and the optional step of identifying a long acronym may take place in any order. The objective of the program is to determine if the name datum is a multi-part name, obvious initials, a long acronym, 2-3 small initials, or an ordinary name, and processes it accordingly. Despite the sequential order discussed in FIG. 37, the program constructs SQL statements for all searches and actually conducts all searches together if possible.

By using user-selected features, the program constructs SQL statement. In order to keep track of the location of each of the name data in document address field, one SQL statement is constructed for each of the name data. However, when the same name datum is also used for firm name search, additional SQL statement is required. After the SQL statement is constructed and runs, the server returns a result page showing all records that actually match the name data according to selected match methods. All name searches are to retrieve identical columns, and thus all SQL statements can be combined by using "Union" in the preferred embodiment. Thus, instead of conducting each search, the program builds a SQL statement by using individual statement segment by union so that all searches can be done at once. To track the field number and the position number of each name datum, each segment statement incorporates address fields by i-loop and name's position number by j-loop. An example of statement is "sqlbuf.append(i); sqlbuf.append("as fieldNo,"'); sqlbuf.append(j); sqlbuf.append("'as no, '1' as firm_order from table_name where type in(''); sqlbuf.append (typeStr); . . . ." The similar statements can be written for any database application.

7. Name Search Results

The program displays only the records for the types of persons and entities the user wants to see. The name table contains attorney names, client's employee names, client's partner names, and other parties names, the search page allows the user to determine which of those classes of people and entities appear in the search result. If the user selects only law firm, the program shows only attorney names in the result. Preferably, all records are displayed in different background colors according to their types so that the user can instantly know their roles (indicated by different shades in 805 in FIG. 34) One color scheme might be that blue for law firm, pink for client, yellow for partners, and gray for third parties. A single name datum may be associated with several types, as shown in FIG. 34. The found name data can be displayed in one of several orders, which are shown in the setup page in FIG. 33. In a preferred embodiment, the name data from the name source are shown in the first three columns: full name, address fields, and their appearance order within an address field. In the first column on the result page, the name data are from the name source data in the input box. The number is the appearance order number of the name data in the search range or the relevant address field. When there are plural identical fields, some name data could have same order number.

For each of the name data, the program shows a list of found name data according to the order that the user has chosen in the search settings. There are several sorting schemes available on the drop-down menu. The found name data may be first sorted by firm name, then by email address, and then by last name in an alphabetic order. The order will be changed upon selecting and releasing a selection. At the top of the search result shown in FIG. 35, there are four links 806: "Show names not matched," "Hide names not matched," and "Show matched names" and "Hide matched names." Upon clicking "Show names not found," the browser shows those names that are not found in the name table (FIG. 35). Those names may be embedded on the web page.

8. Adjustments to Search Settings

The program allows the user to adjust search settings from time to time, depending upon source data, the nature of project, the structure of the name table, and the substance of the data in the name table. Searches may be conducted with different mark words for search ranges, different mark words for ignored ranges, and different ignore words. Also, it is desirable to change the scope of searches from time to time. Therefore, it is desirable to be able to change search settings. There are three methods for configuring search settings.

Program Level Configuration.

The settings for system's search configuration are written into the program, or saved as a program property file or database records that are not changed by users.

User Level Configuration.

The user-level configuration can be set up by the user and permanently saved in a data record controlled by the user. The settings are saved in a database table for each of the users. The user can retrieve, change and update the settings under the user account. The same settings will be available to the user whenever the user logs in. On the setup page, the user can revert this configuration to a system's default by clicking "Revert to System Default."

User's Current Search Settings.

This is a search configuration, which can be set and used by the user any time by clicking the check box preceding the option. The search settings are persistent throughout the session. The values of the settings are not written to a data record.

The settings are sent to the server each time when the user submits a search page and the setting values are returned to the client on the result page. The values may be saved in session object for the user. If the user logs out and restarts the server, the setting values will come from the system's default.

The search page has a mutually exclusive radio button, which may be used to select default search mode or current search mode. When Current Search is selected, the settings can be viewed by clicking the View link, the user can quickly make adjustments to the search settings and submit the page for a search. The page for setting up current settings is identical to the page for setting up default search. If the user needs to change search settings frequently, the user should use current search mode. The user can quickly adjust the current settings and submit the page with source data to conduct a search.

On the page showing unmatched name data, the user may select any of them and add it in the name table. After selecting the check box for a name datum, the user clicks the "Add Name to Table" button, the server responds with a data entry form with names filled in relevant input boxes and with additional input boxes for accepting information. After the form is filled, the user submits the form to the server to have the name datum written into the name table. It is desirable to have the ability to pop-up plural pages for adding plural names to the name table in a way similar to the data entry page. The user just fills in missing information for each of the pop-up forms and submits each of the forms to the server to have the name data added to the name table.

When the user uses default settings, the search data submitted from the browser contain a flag signaling that the search is conducted by default mode. The program gets setting values from the database record for the user. The values of default settings may be embedded on the web page. When the user opens the default setup page, the values of the default settings are retrieved from the record and are placed on the search page. The browser could pass the values back to the server for use without retrieving setting values again. If the search page do not carry setting data, the server must get it before conducting each search.

9. Organization of Program Files in an Example

The investigative name data search module in the preferred embodiment comprises a JSP search page for submitting search data and search settings, and a JSP result page for presenting search result, a java servlet class and a core search algorithm. In conducting search, the user opens the JSP search page. The user selects search mode, configures search settings, enters source data in the search box, and submits the page to a servlet program where the source data and setting values are retrieved and processed. The servlet program then conducts all necessary pre-processing including removing garbage, getting search ranges, and removing ignored words and ranges. For each of good name data segment, it determines the delimiter and length, and properly breaks up the name data and stored them in variables. The servlet program then calls the core search program for conducting all searches by a statement like List searchRes=searchclass.search(email, first_name, last name, middle_name, type, mark_word, search_methods, order). String mark_word[ ] contains all mark words; String type contains a string flag in the form of "1, 2, 3, 4" as signals, respectively, for denoting party own attorneys, client employees, opposing attorneys, and other parties. The value of "1,2" of the flag signals the program to find only party attorneys and client employees. String search_methods contains plural delimited flags (e.g., "fg1, fg2, fg3, fg4, fg5 . . . ") each of which signals the use of an associated match method. A positive flag value signals the program to use a particular search, but it may not actually conduct such a search if qualified data does not exist. For example, if searching small initials in comment is on, but a name datum is not a small initial, the program will not conduct this search. String order defines the display order. This flag has possible values enf, fne, nef, efn, fen, nfe, where "n" is for person name, "f" for firm name, and "e" for email address. Thus, "fne" signals that the result is first sorted by firm name, and within each firm name, the data records are further sorted by person name, and within a person name, the data records are sorted by email address. String email[ ][ ], first_name[ ][ ], last_name[ ][ ], middle_name[ ][ ] are all two dimensional strings holding processed name data. Two dimensions arise because the name data have plural mark words and plural name data are associated with each of the marked ranges, corresponding to the document address fields. The appearance order of individual name datum within an address field is the index number +1 for the correspondent mark word. The returned result is a list of objects containing search results.

The core search program conducts all searches. This program first breaks up the order flag to get the respective sorting keys by using statement: if(order.equals("nef")) {orderStr=", lastname,firstname,email,company."} This sorting segment is used in a SQL statement for search. The program conducts all basic searches as long as required data such as email address, first name and last name exist. Even those basic searches may be implemented as switchable in this core program. The default searches can be defined by def_methods="fl;fil;ci" (where ci denotes a search using capital Initials). The program goes through all address fields (i.e., mark words) by i loop, and for each of the fields, it goes though all individual name data (the j loop). Within the j loop, the program checks if a search method is on, and, if it is on, and checks if the required data exist or meet the pattern of initials (like "A.B.C."). If both conditions are met, the program constructs a SQL statement for this search. For the entire names within the two loops, the program constructs an SQL statement by union. After the program finishes the two loops, it runs the SQL statement to get a result set. The search methods discussed in FIG. 37 means construction of SQL statement for each search. It searches the name table just once. This core program may use SearchBean, a java bean, to store the search result. It has id, email, first name, middle name, last name, company, entry date, type, comments, field no, and appearance no.

The servlet program gets the result. It then separates the name data into two groups: one for found records and one for unmatched records. It finally assigns name data with found records to a designated variable, assigns the name data without found records to another designated variable, and assigns the values of the search settings to designated variables by using a series of setAttribute statements. Finally, the servlet program makes a call to a JSP page for displaying search results. The field values (i.e., all mark words such as "from," "to," and "cc") and the appearance order of each name datum are passed onto the final result page because they appear on the result page (FIG. 34). If a name is from an email, it may indicate email address where the name is from. The display "order" is also passed to the result page because it is used in the drop-down menu for changing the display order.

The core algorithm can be placed in the servlet program or written as two or more separated files. A preferred code structure is to separate core algorithm from the servlet program. After the servlet program retrieves the name data and processes the setting values, it passes the pre-processed name data and the values of search settings to the core program for conducting searches, and the core program returns search results to the servlet program. Upon getting the result, the servlet program assigns the result data and setting values to designated variables by using a series of setAttribute statements, and makes a call to the JSP result page for presenting the results.

The search page is embedded with tools for selecting search mode and configuring search settings. When this page is called, the server retrieves the default search settings and embedded default setting values on the hidden variables. It shows only a summary of default settings, but the user can expand it to see their details. The user can click the setup button to open the page for setting up default settings and save them. It also has a check box for selecting search mode, and the settings for current search mode. When the user selects current search mode, the server gets the current settings and conducts name searches according to current settings. All of the search settings may be implemented by a conventional method: using one integer or char as flag for each feature. Any optional feature can be turned on or off by changing the value of the associated flag.

The core program has many options for controlling search methods and the name table is configurable. Additional measures are necessary to ensure that the program will not hang due to a missing or wrong database fields in the name table. The table structure may be created by using a proper configuration file. To avoid possible mishap from operational mistake, it is important to propose a convention for naming fields in the name table. In a typical name table, common fields include first name, last name, middle name, company, email address and comment. A simple rule is that all common fields are named by a single word in a singular form or two single words connected by "_". The manager is required to know this rule before the manager can configure and modify the name table. Also, the type field is special because their values are associated with the display color in the search result. In addition, the program should check data structure of the name table. Finally, a test file containing a list of name data can be used to conduct name search test against a long list of names in the name table to ensure that the program functions properly.

The program contains code for determining whether certain target fields exist in the name table by checking the Head table or by using database "des" statement if the Head table does not keep table fields. For example, the program can determine if an email address field ("email" or "email_address") exists. If it does, the program searches email addresses in the email address field. If it does not, the program uses the comment field ("comment" or "note") as an alternative search target. The program can also detect the middle name field by looking for "middle" or "middle_name" in the name table. If a middle name field exists, the program searches middle names in the middle name field. Otherwise, the program does not. If the program determines that the type field doses not exist in the name table, matches are made without regarding type value. The field naming convention can be used to reduce risk of error.

G. Identity Data Search, Sorting, and Duplicate Elimination

An identity data processing algorithm ("IDPA") is used to process name data lists. When a client' document containing privileged information has been circulated to its staff, the identities of those who have access to the document must be identified in a privilege log so that the opposing party can ascertain whether a privilege claim is proper. It is very time-consuming to process email messages because they are often sent to many staff members. The identities of original senders, recipients, and cc-recipients must be entered in the privilege log. In addition, the identities of those who later read the document must appear in the privilege log.

Different law firms like to write name data in different ways. The common practice is that the names of the original sender, recipients and cc-recipients appear in individual address fields while all later recipients appear in another field such as additional recipients. In addition, those name data may be listed in an order of preference such as alphabetic order or the order used in the original document. Finally, law firms may use different formats of writing the names in the privilege log. The above algorithm can be used to perform those functions. It has a data input page (FIG. 38) which contains two large input boxes: the top box 860 ("Group A") is for accepting source data that contains the names of subsequent recipients, including readers, recipients and cc recipients, and the bottom box 861 ("Group B") is for accepting source data from address fields of the email that gives rise to privilege claim.

The name-processing page has similar setup features as for the name search page. It has two processing modes: current mode and default mode. The default mode uses the settings saved in a database table, while the current mode uses the current settings that are sent to the server each time of processing name lists. The page for setting current mode is similar to FIG. 33 except that it has the following additional settings:

Duplication Elimination:
[ ] Delete from the group A all the names that exist in the group B
[ ] Allow duplicate names between the two groups.
Name Output Format:
[ ] First_name Last_name [ ] First_name MI Last_name
[ ] Last_name, First_name [ ] Last_name, First_name MI.
Group A Name Output Order:
[ ] Original name order [ ] Reverse original order [ ] Alphabetic last name
Group B Name Output Order:
[ ] Keep original subgroup [ ] Reorder all names within Group B.

The default setup page is identical to the setup page for the current mode except that the default settings are saved permanently. The format for group B has two options: output name data grouped according to their address fields such as sender, recipients and cc-recipients as shown in FIG. 40 or in a pooled group. The user can also decide how the name data are sorted within each of the groups or subgroups by using the sorting tool 863 in FIG. 40. The names are displayed in the option, first name in alphabetic order. However, if the user opens the drop-down menu, it has four options: first name in alphabetic order, first name in reverse alphabetic order, last name in alphabetic order and last name in reverse alphabetic order. The user can change the name display order.

There are four buttons 862 below the large input box for the Group B. Those buttons allow the user to reuse the page. The user can clear up the source data from the Group A box or the Group B box by clicking one of the first two buttons, or clear all data by clicking the "Clear All" button. After the user fills source data in one or two input boxes, the user submits the page by clicking the "Submit" button. Those buttons allow the user to conduct repeating operations. Name data and setting values are sent to the server, names and setting data are retrieved, and name data are processed according to the default setting or current settings. The server returns the results in one or two output boxes (as shown in 864, 865) with necessary setting values embedded on re-generated page. The original name source data may be refilled in both original input boxes so that the user can edit name source data and repeat the operation for a different result.

This program includes a call to a program that is substantially identical to the identity data search algorithm to find all name data that match at least one record in the name table. Among those found records, some of them are of party's attorney. Those name data associated with attorney records are marked with "Esq.*" next to the last name. Some examples are G. M. Homes, Esq* and M. Howa, Esq.* If matches are found according to the perfect match methods, the user can trust those marks. If the names results are obtained by using inclusive match methods, the marks indicate they are possible matches. In this case, different marks such as "*d," "*l" "*p" may be attached by the program to indicate definite match, likely match and potential match. All the names without any of those marks thus can be excluded as party's attorneys. The user does not need to check all names against all attorney names list. If the coupled name table contains a complete set of attorney names, the user should remove the marks ("*l" "*p") for those names that are not attorneys.

Since the name table contains attorneys, client's employees, business partners, and other parties, different marks are designated for different entity types so that the program may be used to find records that belong to a specific type. If the purpose of using the algorithm is to find party's attorneys, the user can exclude all records for other types players by checking only the law firm type for output. The underlying name search algorithm actually marks different parties in different colors. It is easy to indicate their types, for example, by notation such as Esq.*X, Clt.*, Ptn.*, and Trd.* where X=d, l or p, to indicate three confidence levels. By selecting types and using different markings, the names of various types can be displayed in distinctive colors and looks.

The result page in FIG. 40 contains two links: "Show names in table format" below each of the two result boxes. When the user clicks the link below the output box for the Group B, the page shows a list of names in a table view where the user can select any of them for deletion (FIG. 41). After one or more entries have been deleted from the table, the user can cause the server to hide the table again, and display the output box that no longer shows the deleted names. The user can manually copy the processed names from the output box for the Group B, respectively, to the author, recipients and cc fields on a privilege log form and copy the name data from the output box for the Group A to a designated field on the privilege log form.

On the page showing sorted name data (FIG. 41), an additional button, "Add New Name" is placed for adding selected names to the name table (outside the figure). This function also exists on the name search result page. In each case, the user selects an entry and clicks this button, the browser opens a page like the data entry page for the name table except that relevant fields have been filled by first name, last name, middle name, and email address, if they exist. After the user fills in missing data in the remaining input boxes, the page is submitted to the server to have the name saved in the name table. FIG. 42 shows the buttons 866 for repeating operatoions.

Additional features may be added to the setup page so that the user can have an option to pool all name data in the output. A simple work around is to pool all name data together, copy them in one single box, and submitted to the server. The output will be in one corresponding box.

H. Integrated Discovery Methods

Discovery is an extremely time-consuming and difficult process. Most of the times, software cannot successfully replace human intelligence because it is impossible to conceive all possible factors and parameters concerning litigation. Accordingly, it is preferred to develop a method that is highly adaptable.

There are more than a dozen discovery platforms commercially available and can be found on the Internet. Regardless of their brands, they are able to deliver documents to the user's terminal for review. Generally, all of them use HTML files, which allow the reviewers to copy any part of text from the Browser. Some systems use PDF file format that also allows users to copy data. If a document is displayed in images such TIFF or other format, it is impossible to copy text from the image. In this case, the user must type information into an interface form of this system for submission.

In document review, the reviewer is asked to answer a few questions such as whether the document is responsive to any of the specified classes of documents or specifications. If the reviewer encounters a transaction, a person of interest, a product in litigation, or any other critical document, the reviewer may copy the information and paste it on the server pad. The reviewer can periodically update the server pad while adding more and more information. The reviewer can use the pad to find information by interactive search and conventional search.

If the reviewer believes that a particular piece of information is important to all reviewers on the project, the reviewer may input the information to a project-wide table. If the reviewer encounters the name of an attorney who is a counsel of the party, the reviewer may add the name to the name table by copying and pasting it in the input box for the name table and having the page submitted to the server.

The most efficient way of using this discovery information management system is to integrate a review platform with this system into one so that data transfer between the document from the review platform, and all tables on this system is fast and reliable. In an alternative, the review platform may be modified to have a page, which can get relevant data for background submission. The page is submitted to the address of this system for processing. The server sends responsive data foreground or background. In this arrangement, access privilege cannot be handled by using session objects. The data security must be maintained by using a private network connection and password verification.

The second method, which is a workaround method, is to use the right click menu of the browser. On the browser that supports right-click menu, when a user selects and activates some text on the browser and clicks the right button on the mouse, the browser displays a few drop-down menu items, which may include Copy and Property. Some commercial web pages may include a menu for conducting a Google search using selected text. More functions can be added to this menu list. For example, it is desirable to add a menu item "Add Attorney Name." Upon selection of an identity datum and clicking this new menu item, the browser calls with the data as a parameter to this system, which opens a page for adding the identity datum into the name table with the data pre-filled. The concept for this method is shown in the illustration in FIG. 44 for document log. [comment: general subject matter and special subject is often used in production log or hot document log.] After the user fills more data into the input boxes on the web form, the user can manually submit the form to the server to have the data saved. The system may briefly interrupt the browser for document review. It is preferable to select and send data by a single data block. The server program that accepts the data breaks up the source data so that each of the data components can be correctly written into the database table.

The third method is to use a menu embedded on the review platform's browser for direct submission. A script function gets user-selected data, uses the data and site address including program name as parameters to construct a URL to call a server program on this system. The server receiving the data processes the data without return message, or preferably with a returning status message without interrupting the review browser. In this case, the processing server must accept public clients with session object disabled. To maintain data security, the server may be run in a secured private network and password verification may be used.

The last method is to use the copy and paste method to transfer data from the review platform to the browser for this system. When an interesting datum is encountered, the datum is copied into the input boxes on a form, which is then submitted to the server of this system. If the source data contain plural identity data, the data may be submitted as one single data block. The server program that accepts the data breaks up the source data and processes them so that each of the data components can be correctly written into the database table. For maximum flexibility, the submission page should have a parameter to indicate the nature of the source data. The receiving program thus knows the source data and processes them by a method consisting with the source data.

For most discovery projects, one of the common tasks to construct a production log containing a list of documents responsive to a discovery request. Each of the fields in the production log may take certain information. For example, the field for document types may accept only about 10 type values such as email, letter, press release, spreadsheet, contract, governmental filing, and court pleadings. In this case, the data source for selection may be a fixed source. An interactive feed of all document types in the selection box can dramatically improve data entry speed. In comparison, the number of transactions for a transaction table may be very large. In this case, the interactive data source should be one or more database fields.

The system offers the flexibility to link a data input box for any field of a table to a data source. The data source for author name in a production log may be the first name field and the last name field of the name table. The data source may be even the destination field to which data are entered. By using such an arrangement, previously entered data can be shared in later data entry. After a reviewer A resolves a name identity and enters it into the name table, reviewer A can use it again later. Reviewer B can also retrieve it and use it in building another log such as a hot document log. Any data in any table can be used by the same reviewer at two different stages, shared by different reviewers in building the same table, and shared by reviewers in building different tables. It is also clear that dynamically configurable ability can further increase the value of the system.

Similarly, the reviewer may be asked to produce information such as general subject matter or specific subject matter the document is about. This information may directly sent into the relevant field of the production log, hot document log, or privilege document log. Such data are then used to generate a description automatically by one of the construction methods according to a language pattern provided by law firms. By using the method, the description for the description field can be generated automatically.

In most document review systems, the most serious problem is the limited space available for reviewers. The user may have only a small fraction of working space. Space utilization rate may be improved by properly designing the review platform.

The alternative solution is to use two-monitor display system. Currently, a large number of video display cards commercially available support twin-view display mode on both Windows and Linux systems. All NVIDIA series 5 to 9 video cards with the unified drivers support twin-view mode. After a proper card and a suitable driver are installed, it is easy to configure a twin-view mode. Two monitors can be arranged in different ways. The primary monitor displays the browser showing the document under review while the secondary monitor shows the browser of this system. When such a twin-view display system is used, the reviewer can pick up all information from a browser on one display and fill it in any of opened web forms placed on another display for submission. The user can also retrieve information by using the global search function.

The database tables in this disclosure serve as examples. Many different structures can be used to achieve the same objective. Any of the leading commercial database applications may be used to achieve the same purposes. While the concept is implemented in Java and JSP in this disclosure, it can be implemented in other development environments such in Java EE, PHP, and service-oriented architecture ("SOA"). While the system is deployed in Fedora Core 5 to 8, they can run in Window XP, Windows Server, Solaris, Mac Operating System, and any of other Linux Operating Systems. Many programming languages may be used to implement the concept and its functions. For example, CGI C programs and apache HTTP can be used to implement the concept.

In those exemplary embodiments of the present invention, specific components, hardware parts, arrangements, and processes are used to practice the invention. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

What is claimed is:

1. A method for identifying one or more identity data in source data in a table or file that contains a plurality of identity data, each identity datum representing a person or an entity, the method comprising the steps of:
   breaking up the source data into one or more individual identity data;
   comparing each of the individual identity data with each of the identity data in the table or file to determine if there is a match;
   marking each identical datum that has been a match with an identity datum in the table or file with a marking indicating the type of the matched identity datum;
   arranging all marked identity data and all unmarked identity data in a result in a suitable format; and
   returning the result showing unmarked identity data and matched identity data with markings.

2. The method of claim 1, further comprising the step of marking each matched identity datum with a comment or an entity name from the table or file.

3. The method of claim 2 wherein the identity data from the source data include email address, name initials, single word, and full names, and the table or file contains first names, last names, and comments.

4. The method of claim 3 wherein the matching step further comprises the steps of:
   matching each email address from the source data with email addresses in the table or file;

matching each full name from the source data with full names in the table or file;

matching each of the single words from the source data with first names and last names in the table or file; and matching each name initial of each identity datum from the source data with the first letters of the words of each identity datum in the table or file.

5. The method of claim 4, further comprising the steps of:

identifying all identity data that contain two to three letters;

generating variants for each identity datum containing two to three letters;

comparing each variant of each identity datum with correspondent first letters of the words of each identity datum in the table or file; and marking each identical datum that has been a match with an identity datum in the table or file with a marking indicating the type of the matched identity datum.

6. The method of claim 1, further comprising a preprocessing treatment step selected from the group consisting of:

removing garbage and special characters;

extracting data segments from the source data using default or user-provided marks;

removing ignored words and ignored ranges from each of the segments; and returning the segment to be further processed as a starting source data.

7. The method of claim 6, further comprising the steps of marking identity data that have not been found in the table or file and returning the identity data with the information indicating their locations in the source data.

8. A method of determining whether any identity data in source data exist in a table or file on a client-server system, the method comprising the steps of:

generating a search page containing an input box and user-definable search settings;

accepting in the input box a source data that are provided by a user;

submitting the user-provided source data with user-defined search settings to the server for conducting identity data searches according to user-defined search settings;

breaking up the source data into one or more identity data, each of which represents a person or entity;

searching each of the identity data in the table or file;

marking each identical datum that has been found in the table or file with a marking of indicating the type of the matched identity datum;

arranging all marked identity data and all unmarked identity data in a result in a suitable format; and returning the result containing the unmarked identical data and the marked identity data together with markings.

9. The method of claim 8, further comprising the step of marking each matched identity datum with a comment or an entity name associated with the matched identity datum in the table or file.

10. The method of claim 8, further comprising of the steps of:

removing garbage characters and special characters from the source data;

extracting data segments from the source data using one or more default marks or user-provided marks;

removing ignored words and ignored ranges from each of the segments by using default marks or user-provided marks; and returning each of the resulted segments as source data for further processing.

11. The method of claim 10 wherein the search page includes search settings with options for selecting a search mode, defining a delimiter for breaking up source data, selecting one or more match methods, selecting an output format for identity data; and selecting a display order for displaying identity data.

12. The method of claim 8, further comprising a step selected from the group consisting of matching each email address from the source data with email addresses in the table or file, matching each of the single words from the source data with first names and last names in the table or file, matching each obvious name initials from the source data with the first letters of the words of each of the identity data in the table or file, and matching the letters of each short identity datum with the first letters of the words of each of the identity data in the table or file.

13. The method of claim 8, further comprising the steps of marking up identity data that have not been found in the table or file and adding an identity datum in the table or file as a record.

14. A method of processing identity data for at least one data source, each data source being in one input box on a web page, the method comprising the steps of:

submitting the data source in the at least one input box on the web page to the server;

retrieving each data source from the submitted web page;

breaking up each data source to form one or more individual identity data;

identifying each of the identity data by full name, email addresses, obvious initials, and single name;

sorting identity data according to a default or user-selected sorting key;

arranging each of the identity data in a default or user-selected format, and appending all properly arranged identity data according to the sorting order with a delimiter to form a result; and returning the result for each of the at least one data source in an output box.

15. The method of claim 14, further comprising the steps of searching each of the identical data in a table or file and marking each identity datum that has been found in the table or file with a distinctive marking.

16. The method of claim 15, further comprising the steps of recognizing each of the identity data, searching each of the identity data in the table or file, and marking each of the found identity data with a marking of indicating the type of the matched identity datum, and showing the marking in the result.

17. The method of claim 16, further comprising the steps of showing the sorted identical data in a table view, deleting an identity datum from the web page, and adding an identity datum to the table or file.

18. The method of claim 14 wherein the web page contains two input boxes and user-definable settings and processed identity data are displayed in two output boxes, respectively, for the two input boxes.

19. The method of claim 18, further comprising a step of eliminating from one output box the identity data that exist in the other output box so that there is no duplicate identity datum between the two output boxes.

20. The method of claim 14 wherein the user-definable settings are selected from the group consisting of a setting for selecting a processing mode, a setting for defining data segment ranges by start marks and end marks, a setting for defining ignored words and ignored ranges, a setting for selecting a delimiter for separating any two identity data, a setting for eliminating duplicate identity data between the first data source and the second data source, a setting for selecting an output format for processed identity data, and a setting for selecting an order to display processed identity data in the output boxes.

21. The method of claim 20, further comprising the steps of removing garbage and special characters, extracting data segments from a first of the at least one data source by using default or user-provided marks and pooling the extracted data segments together, extracting data segments from a second of the at least one data source by using default or user-provided marks and pooling the extracted data segments together, and passing both of the pooled data segments as data sources for further processing.

22. The method of claim 21, further comprising the steps of copying processed identity data from the at least one output boxes to an input box on a second data entry form, filling data in the rest of fields in the second data entry form, submitting the second data entry form to the server, retrieving the data from the submitted second data entry form, and saving the submitted data in the database table for the second data entry form.

* * * * *